United States Patent
Hull et al.

(10) Patent No.: US 7,669,127 B2
(45) Date of Patent: Feb. 23, 2010

(54) TECHNIQUES FOR CAPTURING INFORMATION DURING MULTIMEDIA PRESENTATIONS

(75) Inventors: Jonathan J. Hull, San Carlos, CA (US); Michael Baxter, Sunnyvale, CA (US); Pamela Gage, Redwood City, CA (US); Jamey Graham, San Jose, CA (US); Dar-Shyang Lee, Fremont, CA (US); Peter E. Hart, Menlo Park, CA (US)

(73) Assignee: Ricoh Company, Ltd. (JP)

( * ) Notice: Subject to any disclaimer, the term of this patent is extended or adjusted under 35 U.S.C. 154(b) by 176 days.

(21) Appl. No.: 11/389,513

(22) Filed: Mar. 24, 2006

(65) Prior Publication Data

US 2007/0038935 A1     Feb. 15, 2007

Related U.S. Application Data

(63) Continuation of application No. 09/728,560, filed on Nov. 30, 2000, now Pat. No. 7,167,191, and a continuation-in-part of application No. 09/521,252, filed on Mar. 8, 2000, now Pat. No. 7,299,405, and a continuation-in-part of application No. 09/714,785, filed on Nov. 15, 2000, now Pat. No. 6,976,032.

(60) Provisional application No. 60/244,771, filed on Oct. 31, 2000, provisional application No. 60/166,081, filed on Nov. 17, 1999.

(51) Int. Cl.
    *G06F 3/00*     (2006.01)

(52) U.S. Cl. ..................... 715/716; 715/719; 715/720

(58) Field of Classification Search ................. 715/721, 715/723, 730, 748, 719–720, 776, 716
See application file for complete search history.

(56) References Cited

U.S. PATENT DOCUMENTS

| 4,578,718 A | 3/1986 | Parker et al. |
| 4,686,698 A | 8/1987 | Tompkins et al. |
| 4,787,063 A | 11/1988 | Muguet |
| 4,807,186 A | 2/1989 | Ohnishi et al. |

(Continued)

FOREIGN PATENT DOCUMENTS

JP     403129990     6/1991

(Continued)

OTHER PUBLICATIONS

Hilbert, et al., Seamless Capture and Discovery for Corporate Memory, *The 15th International World Wide Web Conference (WWW2006)*, May 23, 2006.

(Continued)

*Primary Examiner*—Weilun Lo
*Assistant Examiner*—Truc T Chuong
(74) *Attorney, Agent, or Firm*—Townsend and Townsend and Crew LLP

(57) ABSTRACT

Techniques for capturing information during multimedia presentations. According to an embodiment, the presentation recording appliance (PRA) receives multimedia presentation information comprising video information and/or audio information. The PRA may also receive information from external sources other than the first source. The audio and video information received by the PRA is then processed and stored in a format which facilitates subsequent retrieval.

35 Claims, 11 Drawing Sheets

U.S. PATENT DOCUMENTS

| | | | |
|---|---|---|---|
| 4,881,135 A | 11/1989 | Heilweil | |
| 4,905,094 A | 2/1990 | Pocock et al. | |
| 4,963,995 A | 10/1990 | Lang | |
| 5,091,931 A | 2/1992 | Milewski | |
| 5,164,839 A | 11/1992 | Lang | |
| 5,206,929 A * | 4/1993 | Langford et al. | 715/723 |
| 5,265,205 A | 11/1993 | Schroder | |
| 5,321,396 A | 6/1994 | Lamming et al. | |
| 5,363,425 A | 11/1994 | Mufti et al. | |
| 5,436,792 A | 7/1995 | Leman et al. | |
| 5,475,741 A | 12/1995 | Davis et al. | |
| 5,485,611 A | 1/1996 | Astle | |
| 5,491,511 A | 2/1996 | Odle | |
| 5,502,774 A | 3/1996 | Bellegarda et al. | |
| 5,526,037 A | 6/1996 | Cortjens et al. | |
| 5,530,235 A | 6/1996 | Stefik et al. | |
| 5,535,063 A | 7/1996 | Lamming | |
| 5,537,141 A | 7/1996 | Harper et al. | |
| 5,539,665 A | 7/1996 | Lamming et al. | |
| 5,568,406 A | 10/1996 | Gerber | |
| 5,596,581 A | 1/1997 | Saeijs et al. | |
| 5,610,841 A | 3/1997 | Tanaka et al. | |
| 5,633,723 A | 5/1997 | Sugiyama et al. | |
| 5,635,982 A | 6/1997 | Zhang et al. | |
| 5,673,016 A | 9/1997 | Lutes | |
| 5,686,957 A | 11/1997 | Baker | |
| 5,706,290 A | 1/1998 | Shaw et al. | |
| 5,717,869 A | 2/1998 | Moran et al. | |
| 5,717,879 A | 2/1998 | Moran et al. | |
| 5,721,878 A | 2/1998 | Ottesen et al. | |
| 5,729,741 A * | 3/1998 | Liaguno et al. | 707/6 |
| 5,729,931 A | 3/1998 | Wade | |
| 5,734,719 A | 3/1998 | Tsevdos et al. | |
| 5,751,281 A | 5/1998 | Hoddie et al. | |
| 5,760,767 A | 6/1998 | Shore et al. | |
| 5,764,789 A | 6/1998 | Pare, Jr. et al. | |
| 5,767,897 A | 6/1998 | Howell | |
| 5,793,365 A | 8/1998 | Tang et al. | |
| 5,799,150 A | 8/1998 | Hamilton et al. | |
| 5,802,294 A | 9/1998 | Ludwig et al. | |
| 5,845,261 A | 12/1998 | McAlbian | |
| 5,854,831 A | 12/1998 | Parsadayan et al. | |
| 5,862,292 A | 1/1999 | Kubota et al. | |
| 5,924,099 A | 7/1999 | Guzak et al. | |
| 5,929,848 A | 7/1999 | Albukerk et al. | |
| 5,946,654 A | 8/1999 | Newman et al. | |
| 5,956,026 A | 9/1999 | Ratakonda | |
| 5,978,477 A | 11/1999 | Hull et al. | |
| 5,986,655 A | 11/1999 | Chiu et al. | |
| 5,987,454 A | 11/1999 | Hobbs | |
| 5,990,934 A | 11/1999 | Nalwa | |
| 5,991,429 A | 11/1999 | Coffin et al. | |
| 5,999,173 A | 12/1999 | Ubillos | |
| 6,008,807 A | 12/1999 | Bretschneider et al. | |
| 6,020,883 A | 2/2000 | Herz et al. | |
| 6,041,360 A | 3/2000 | Himmel et al. | |
| 6,055,566 A | 4/2000 | Kikinis | |
| 6,084,582 A | 7/2000 | Qureshi et al. | |
| 6,115,718 A | 9/2000 | Huberman et al. | |
| 6,154,601 A | 11/2000 | Yaegashi et al. | |
| 6,154,771 A | 11/2000 | Rangan et al. | |
| 6,177,939 B1 | 1/2001 | Blish et al. | |
| 6,189,783 B1 | 2/2001 | Motomiya et al. | |
| 6,193,658 B1 | 2/2001 | Wendelken et al. | |
| 6,209,000 B1 | 3/2001 | Klein et al. | |
| 6,249,281 B1 | 6/2001 | Chen et al. | |
| 6,332,147 B1 | 12/2001 | Moran et al. | |
| 6,334,109 B1 | 12/2001 | Kanevsky | |
| 6,349,297 B1 | 2/2002 | Shaw et al. | |
| 6,369,835 B1 | 4/2002 | Lin | |
| 6,392,694 B1 | 5/2002 | Bianchi | |
| 6,393,462 B1 | 5/2002 | Mullen-Schultz | |
| 6,396,500 B1 | 5/2002 | Qureshi et al. | |
| 6,405,203 B1 | 6/2002 | Collart | |
| 6,421,009 B2 | 7/2002 | Suprunov | |
| 6,449,653 B2 | 9/2002 | Klemets et al. | |
| 6,452,615 B1 | 9/2002 | Chiu et al. | |
| 6,469,711 B2 * | 10/2002 | Foreman et al. | 715/723 |
| 6,490,601 B1 | 12/2002 | Markus et al. | |
| 6,510,553 B1 | 1/2003 | Hazra | |
| 6,526,426 B1 | 2/2003 | Lakritz | |
| 6,529,920 B1 | 3/2003 | Arons et al. | |
| 6,535,639 B1 | 3/2003 | Uchihachi et al. | |
| 6,571,295 B1 | 5/2003 | Sidana | |
| 6,646,655 B1 | 11/2003 | Brandt et al. | |
| 6,665,490 B2 | 12/2003 | Copperman et al. | |
| 6,721,288 B1 | 4/2004 | King et al. | |
| 6,721,488 B1 | 4/2004 | Dimitrova et al. | |
| 6,728,753 B1 | 4/2004 | Parasnis et al. | |
| 6,750,978 B1 | 6/2004 | Marggraff et al. | |
| 6,766,363 B1 | 7/2004 | Rothschild | |
| 6,779,024 B2 | 8/2004 | DeLaHuerga | |
| 6,782,049 B1 | 8/2004 | Dufaux et al. | |
| 6,789,228 B1 | 9/2004 | Merrill et al. | |
| 6,810,146 B2 | 10/2004 | Loui et al. | |
| 6,816,858 B1 | 11/2004 | Coden et al. | |
| 6,976,032 B1 | 12/2005 | Hull et al. | |
| 7,020,721 B1 | 3/2006 | Levenberg | |
| 7,131,058 B1 | 10/2006 | Lapstun et al. | |
| 7,167,191 B2 | 1/2007 | Hull et al. | |
| 7,174,289 B2 | 2/2007 | Sukehiro | |
| 7,184,100 B1 | 2/2007 | Wilf et al. | |
| 7,215,436 B2 | 5/2007 | Hull et al. | |
| 7,299,405 B1 | 11/2007 | Lee et al. | |
| 7,343,617 B1 | 3/2008 | Katcher et al. | |
| 7,478,125 B2 | 1/2009 | Chang | |
| 7,508,419 B2 | 3/2009 | Toyama et al. | |
| 7,554,576 B2 | 6/2009 | Erol et al. | |
| 2001/0037408 A1 | 11/2001 | Thrift et al. | |
| 2001/0054019 A1 | 12/2001 | De Fabrega | |
| 2002/0010641 A1 | 1/2002 | Stevens et al. | |
| 2002/0048224 A1 | 4/2002 | Dygert et al. | |
| 2002/0056082 A1 | 5/2002 | Hull et al. | |
| 2002/0097885 A1 | 7/2002 | Birchfield et al. | |
| 2002/0163548 A1 | 11/2002 | Chiu et al. | |
| 2002/0169849 A1 | 11/2002 | Schroath | |
| 2002/0171857 A1 | 11/2002 | Hisatomi et al. | |
| 2002/0185533 A1 | 12/2002 | Shieh et al. | |
| 2003/0007776 A1 | 1/2003 | Kameyama et al. | |
| 2003/0117652 A1 | 6/2003 | Lapstun | |
| 2003/0220988 A1 | 11/2003 | Hymel | |
| 2003/0234772 A1 | 12/2003 | Zhang et al. | |
| 2004/0054964 A1 | 3/2004 | Bozdagi et al. | |
| 2004/0078805 A1 | 4/2004 | Brian et al. | |
| 2004/0105004 A1 | 6/2004 | Rui et al. | |
| 2004/0143602 A1 | 7/2004 | Ruiz et al. | |
| 2004/0143630 A1 | 7/2004 | Kaufmann et al. | |
| 2004/0201685 A1 | 10/2004 | Seaman et al. | |
| 2004/0249650 A1 | 12/2004 | Freedman et al. | |
| 2004/0263636 A1 | 12/2004 | Cutler et al. | |
| 2005/0064935 A1 | 3/2005 | Blanco | |
| 2005/0114521 A1 | 5/2005 | Lee | |
| 2006/0005136 A1 | 1/2006 | Wallick et al. | |
| 2006/0041542 A1 | 2/2006 | Hull et al. | |
| 2006/0041632 A1 | 2/2006 | Shah et al. | |
| 2006/0284981 A1 | 12/2006 | Erol et al. | |
| 2006/0288273 A1 | 12/2006 | Erol et al. | |
| 2007/0033419 A1 | 2/2007 | Kocher et al. | |

FOREIGN PATENT DOCUMENTS

| | | |
|---|---|---|
| JP | 07-234694 A | 9/1995 |
| JP | 08-125737 A | 5/1996 |
| JP | 10-246041 | 9/1998 |

| | | | |
|---|---|---|---|
| JP | 2007-004784 A | 1/2007 | |
| KR | 2003-0097669 A | 12/2003 | |
| KR | 10-2006-0133469 A | 12/2006 | |
| WO | WO 02/13522 A2 | 2/2002 | |
| WO | WO 02/058432 A2 | 7/2002 | |

OTHER PUBLICATIONS

Hilbert, et al., Seamless Presentation Capture, Indexing, and Management, *Internet Multimedia Management Systems VI* (*SPIE Optics East 2005*), Oct. 26, 2005.

Denoue, et al., ProjectorBox; Seamless Presentation Capture for Classrooms, *World Conference on E-Learning in Corporate, Government, Healthcare, & Higher Education* (*E-Learn 2005*), Oct. 24, 2005.

Addlesee et al., "The ORL Active Floor," IEEE Personal Communications, vol. 4, No. 5, Oct. 1997, pp. 35-41. ftp://ftp.uk.research.att.com:/pub/docs/att/tr.97.11.pdf.

Adobe Premiere Real-Time editing for HD, SD, and DV, pp. 1-2 downloaded and printed from http://www.adobe.com/products/premiere/index.html on Jan. 18, 2007.

AVerMedia DVD EZmaker USB 2.0, 1 page downloaded and printed from http://www.aver.com/2005home/product/videocapture/ezmakerusb2.0/ezmakerusb2.0.shtml on Jan. 18, 2007.

Chen et al., "Real-time Speaker Tracking Using Particle Filter Sensor Fusion," *Proc. IEEE*, 92(3):485-494 (Mar. 2004).

Communication Pursuant to Article 96(2) EPC, European Application No. 04255836.1, Jun. 11, 2007, 10 pages.

Cutler et al., "Distributed Meetings: A Meeting Capture and Broadcasting System," ACM Multimedia (2002).

Cunado et al., "Gait Extraction and Description by Evidencing Gathering," Proceedings of the Second International Conference on Audio and Video-based Person Identification, Washington, D.C., Mar. 22-23, 1999, pp. 43-48.

Eldridge et al., "Does A Video Diary Help Recall?", Technical Report EPC-1991-124, People and Computers VII, eds. Monk et al., 1992, pp. 257-269.

Erol et al., "Multimodal Summarization of Meeting Recordings," ICME (2003).

Foote, J. et al. "An Intelligent Media Browser Using Automatic Multimodal Analysis," ACM Multimedia, 1998, pp. 375-380.

Girgensohn, A, and Boreczky, J.S. "Time-Constrained Keyframe Selection Technique," Multimedia Tools, 11(3): 347-358.

Gross et al., "Towards a Multimodal Meeting Record," ICME, pp. 1593-1596, New York, (2000).

Hu et al., "Audio Hot Spotting and Retrieval Using Multiple Audio Features and Multiple ASR Engines," HLT-NAACL 2004 Workshop on Interdisciplinary Approaches to Speech Indexing and Retrieval (2004).

ICSI Meeting Recorder Project: Recording software, pp. 1-3 downloaded and printed from http://www.icsi.berkeley.edu/~dpwe/research/mtgrcdr/rcd-sw.html on Jan. 18, 2007.

Jaimes et al., "Memory Cues for Meeting Video Retrieval," *ACM CARPE Workshop 2004*, New York, New York, pp. 74-85 (2004).

Konneker, L., "Automating Receptionists," Proceedings of the 1986 IEEE International Conference on Systems, Man, and Cybernetics, Atlanta, GA, Oct. 14-17, 1986, pp. 1592-1596.

Lamming et al., "Activity-based Information Retrieval: Technology in Support of Personal Memory," in F.H. Vogt (ed.), Personal Computers and Intelligent Systems. Proceedings of Information Processing 92, vol. III, Elsevier Science Publishers, 1992, pp. 68-81.

Lee et al., "Portable Meeting Recorder," ACM Multimedia, pp. 493-502 (2002).

Lovstrand, L., "Being Selectively Aware with the Khronika System," Proceedings of the Second European Conference on Computer-Supported Cooperative Work, Kluwer Academic Publishers, 1991, pp. 265-277.

Meet?ng Room, An Interactive Systems Labs Project, p. 1 downloaded and printed from http://www.is.cs.cmu.edu/meeting_room/browser/browser_toprint.html on Jan. 18, 2007.

Nair, R., "Calculation of an Aggregated Level of Interest Function for Recorded Events," ACM Multimedia (2004).

Newman et al., "PEPSYS: Generating Autobiographies by Automatic Tracking," Proceedings of the Second European Conference on Computer-Supported Cooperative Work, Sep. 25-27, 1991, Amsterdam, The Netherlands, pp. 175-188.

Nishimura et al., "Indexing of human motion at meeting room by analyzing time-varying images of omni-directional camera," *Conference on Computer Vision*, 1:1-4 (2000). [Reference not submitted—cannot locate this reference].

Nuance—ScanSoft Imaging Solutions, p. 1 downloaded and printed from http://www.nuance.com/scansoft/ on Jan. 18, 2007.

Plamondon, R.; and Lorette, G., "Automatic Signature Verification and Writer Identification—The State of the Art," Pattern Recognition, vol. 22, No. 2, 1989, pp. 107-131.

Product Description for Meeting Companion by Quindi Corporation, downloaded from http://quindi.com/product.htm on Jan. 24, 2005.

Rangan, P.V. "Software Implementation of VCRs on Personal Computing Systems,"IEEE, 1992, pp. 635-640.

Rangan, P.V. et al., "A Window-Based Editor for Digital Video and Audio," IEEE 1992 pp. 640-648.

Rosenschein, S., "New Techniques for Knowledge Capture," from TTI/Vanguard Conference: Knowledge Management Comes of Age, pp. 1-3, Sep. 23-24, 2003.

Rui et al., "Automating lecture capture and broadcast: technology and videography," *ACM Multimedia Systems Journal*, 10:1-13 (2004).

Seiko Instruments, Inc., "Smart Lobby: The Electronic Sign-In Book That Tracks Visitors and Prints Badges, User Guide for Windows," Manual Part No. 22-93000-00, copyright 1997.

Song et al., "PCCAIS: A Personal Videoconference Archive Indexing System," ICME (2003).

Sony Music Corporation, "E-Guide Unmanned Reception System," Japan Industrial Journal, May 20, 1996, p. 6, (http://salmon.crc.ricoh.com:8001/hull/1999/8/11207/11207.html).

Sony EVI-D100 Pan/Tilt/Zoom Color Video Camera, pp. 1-2 downloaded and printed from http://www.picturephone.com/products/sony_evid100.htm on Jan. 18, 2007.

Stifelman, L. et al., "The Audio Notebook," SIGCHI 2001, Mar. 31-Apr. 5, 2001, pp. 182-189, vol. 3, No. 1, Seattle, WA.

Systran® Language Translation Technologies, p. 1 downloaded and printed from http://www.syttransoft.com/index.html on Jan. 18, 2007.

Uchihashi et al., "Video Magna: Generating Semantically Meaningful Video Summaries," *Proc. Multimedia '99*, pp. 383-392, ACM (1999).

Viredaz, M.A., "The Itsy Pocket Computer Version 1.5: User's Manual," Technical Note TN-54, Compaq Western Research Laboratory, Jul. 1998., pp. 1-37.

Want et al., "The Active Badge Location System," ACM TOIS, Transactions on Information Systems, vol. 10, No. 1, Jan. 1992, pp. 91-102.

WebEx: Web Conferencing, Online Meetings, and Video Conferencing, p. 1 downloaded and printed from http://www.webex.com on Jan. 18, 2007.

Abowd et al., "Anchoring Discussions in Lecture: An Approach to Collaboratively Extending Classroom Digital Media," Computer Support for Collaborative Learning 1999, pp. 11-19, at URL: http://www.cc.gatech.edu/fce/eclass/pubs/csc199/final.htm.

Abowd et al., "Building a Digital Library of Captured Educational Experiences," Invited paper for the 2000 International Conference on Digital Libraries, Kyoto, Japan, Nov. 13-16, 2000, 8 pages.

Abowd et al., "Classroom 2000: A System for Capturing and Accessing Multimedia Classroom Experiences," 3 pages, printed on Mar. 11, 2005 at URL: http://www.cc.gatech.edu/fce/eclass/pubs/chi98/short/index.html.

Abowd et al., "Teaching and Learning as Multimedia Authoring: The Classroom 2000 Project," 1996, 12 pages, ACM Multimedia 1996, Boston, MA.

Brotherton et al., "Automated Capture, Integration, and Visualization of Multiple Media Streams," Proceedings of IEEE Multimedia '98, 1998, pp. 1-12, printed on Mar. 11, 2005 at URL: http://www.cc.gatech.edu/fce/eclass/pubs/ieee98, IEEE.

Brotherton, J. A., "Enriching Everyday Activities Through the Automated Capture and Access of Live Experiences—eClass: Building, Observing, and Understanding the Impact of Capture and Access in an Educational Domain," Ph.D. Thesis, Georgia institute of Technology, Jul. 2001, 287 pages, Jason Brotherton.
Chiu et al., "LiteMinutes: An Internet-Based System for Multimedia Meeting Minutes," Proc. 10th World Wide Web Conference, May 2-5, 2001, 10 pages, printed on May 5, 2004, at URL: http://citeseer.ist.psu.edu/chiu01liteminutes.html.
Chiu et al., "NoteLook: Taking Notes in Meetings with Digital Voice and Ink," Proceedings of ACM Multimedia 1999 Orlando, Florida, 10 pages, Nov. 1999.
Communication from the European Patent Office regarding European Application No. 04 024 390.9-1527, dated Jan. 12, 2006, 6 pages.
Communication from the European Patent Office regarding European Application No. 04 024 390.9-1527, dated Mar. 2, 2007, 5 pages.
Cruz et al., "Capturing and Playing Multimedia Events with Streams," ACM Multimedia 1994, 8 pages, San Francisco, CA, 1994.
Davis et al., "A Framework for Sharing Handwritten Notes," Proceedings of UIST '98, pp. 119-120, Nov. 1998, ACM, San Francisco, Ca.
Lamming, "MDS Past Projects—NoTime—A Tool for Notetakers," Feb. 22, 1991, 3 pages, printed on Apr. 29, 2003 at URL: http://www.xrce.xerox.com/programs/mds/past-projects/notime-report.html.
Lee et al., "MinuteAid: Multimedia Note-Taking in an Intelligent Meeting Room," IEEE International Conference on Multimedia and Expo (ICME), Taipei, Taiwan, Jun. 27-30, 2004, 4 pages, IEEE.
Minneman et al., "A Confederation of Tools for Capturing and Accessing Collaborative Activity," ACM Multimedia 1995, 10 pages, San Francisco, CA.
Minneman et al., "Where Were We: Making and Using Near-synchronous, Pre-narrative Video," ACM Multimedia, 1993, 9 pages.
Moran et al., "Tivoli: Integrating Structured domain Objects into a Freeform Whiteboard Environment," Proceedings of International Conference on Human Factors in Computer Systems (CHI), Apr. 1-6, 2000, pp. 20-21.
Pedersen et al., "Tivoli: An Electronic Whiteboard for Informal Workgroup Meetings," Proceedings of International Conference on Human Factors in Computer Systems (CHI '93), Apr. 24-29, 1993, 8 pages, ACM, New York.
Pimental et al., "Linking by Interacting: a Paradigm for Authoring Hypertext," Proceedings of ACM Hypertext 2000, May 2000, 11 pages, San Antonio, TX.
Price et al., "linking by Inking: Trailblazing in a Paper-like Hypertext," ACM Hypertest 1998, 10 pages, Pittsburg, PA.
Stifelman, L., "The Audio Notebook: Paper and Pen Interaction with Structured Speech," PhD Thesis, Sep. 1997, 150 pages, MIT 1997.
Truong et al., "Architectural Support for Building Automated Capture & Access Applications," Oct. 20, 2003, 10 pages, printed on Feb. 4, 2005, at URL: http://web.archive.org/web/20031020022039/http://www.cc.gatech.edu/classes/AY2004/cs4470_fall/readings/inca-icse03.
Truong et al., "Personalizing the Capture of Public Experiences," Proceedings of UIST 1999, Nov. 1999, 11 pages, ACM, Asheville, NC.
Weber et al., "Marquee: A Tool for Real-Time Video Logging," CHI '94, Apr. 24-28, 1994, 8 pages, Boston, MA.
Whittaker et al., "Filochat: handwritten notes provide access to recorded conversations," Human Factors in Computing Systems Proceedings of CHI '94, Apr. 24-28, 1994, pp. 271-277, ACM Press, Boston, MA.
Wilcox et al., "Dynomite: A Dynamically Organized Ink and Audio Notebook," CHI 1997 Conference Proceedings, Mar. 22-27, 1997, pp. 186-193, ACM Press, Atlanta GA.
Non-Final Office Action for U.S. Appl. No. 09/714,785, mailed Apr. 9, 2003, 27 pages.
Final Office Action for U.S. Appl. No. 09/714,785, mailed Sep. 17, 2003, 25 pages.
Advisory Action for U.S. Appl. No. 09/714,785, mailed Nov. 26, 2003, 3 pages.
Non-Final Office Action for U.S. Appl. No. 09/714,785, mailed Mar. 5, 2004, 25 pages.
Final Office Action for U.S. Appl. No. 09/714,785, mailed Dec. 7, 2004, 33 pages.
Final Office Action for U.S. Appl. No. 09/714,785, mailed Jul. 12, 2005, 8 pages.
Notice of Allowance for U.S. Appl. No. 09/714,785, mailed Nov. 1, 2005, 4 pages.
Non-Final Office Action for U.S. Appl. No. 11/250,780, mailed Jul. 27, 2007, 13 pages.
Final Office Action for U.S. Appl. No. 11/250,780, mailed May 30, 2008, 31 pages.
Non-Final Office Action for U.S. Appl. No. 09/728,560, mailed May 23, 2003.
Interview Summary for U.S. Appl. No. 09/728,560, mailed Oct. 30, 2003.
Notice of Allowance for U.S. Appl. No. 09/728,560, mailed Nov. 4, 2003.
Interview Summary for U.S. Appl. No. 09/728,560, mailed Jan. 21, 2004.
Notice of Allowance for U.S. Appl. No. 09/728,560, mailed Nov. 22, 2004.
Notice of Allowance for U.S. Appl. No. 09/728,560, mailed Dec. 16, 2005.
Non-Final Office Action for U.S. Appl. No. 09/728,453, mailed Dec. 1, 2004, 27 pages.
Final Office Action for U.S. Appl. No. 09/728,453, mailed Sep. 21, 2005, 14 pages.
Advisory Action for U.S. Appl. No. 09/728,453, mailed Feb. 22, 2006, 4 pages.
Non-Final Office Action for U.S. Appl. No. 09/728,453, mailed Aug. 27, 2007, 12 pages.
Final Office Action for U.S. Appl. No. 09/728,453, mailed Apr. 15, 2008, 17 pages.
Non-Final Office Action for U.S. Appl. No. 09/728,453, mailed Dec. 23, 2008, 17 pages.
Non-Final Office Action for U.S. Appl. No. 09/521,252, mailed Jan. 20, 2004, 13 pages.
Non-Final Office Action for U.S. Appl. No. 09/521,252, mailed Oct. 21, 2004, 17 pages.
Interview Summary for U.S. Appl. No. 09/521,252, mailed Nov. 23, 2004, 3 pages.
Final Office Action for U.S. Appl. No. 09/521,252, mailed Jun. 2, 2005, 16 pages.
Advisory Action for U.S. Appl. No. 09/521,252, mailed Oct. 12, 2005, 4 pages.
Non-Final Office Action for U.S. Appl. No. 09/521,252, mailed Jan. 6, 2006, 16 pages.
Final Office Action for U.S. Appl. No. 09/521,252, mailed Oct. 5, 2006, 14 pages.
Interview Summary for U.S. Appl. No. 09/521,252, mailed Mar. 16, 2007, 3 pages.
Interview Summary for U.S. Appl. No. 09/521,252, mailed Jul. 17, 2007, 1 pages.
Notice of Allowance for U.S. Appl. No. 09/521,252, mailed Jul. 17, 2007, 10 pages.
Non-Final Office Action for U.S. Appl. No. 10/722,834, mailed Jun. 22, 2007, 14 pages.
Final Office Action for U.S. Appl. No. 10/722,834, mailed Dec. 13, 2007, 14 pages.
Interview Summary for U.S. Appl. No. 10/722,834, mailed Feb. 14, 2008, 2 pages.
Advisory Action for U.S. Appl. No. 10/722,834, mailed Mar. 4, 2008, 3 pages.
Non-Final Office Action for U.S. Appl. No. 10/722,834, mailed May 13, 2008, 16 pages.
Final Office Action for U.S. Appl. No. 10/722,834, mailed Nov. 13, 2008, 14 pages.
Advisory Action for U.S. Appl. No. 10/722,834, mailed Jan. 21, 2009, 6 pages.
Interview Summary for U.S. Appl. No. 10/722,834, mailed Mar. 30, 2009, 3 pages.
Non-Final Office Action for U.S. Appl. No. 10/722,834, mailed Jun. 9, 2009, 15 pages.
Non-Final Office Action for U.S. Appl. No. 11/158,315, mailed Jul. 30, 2008, 32 pages.

Final Office Action for U.S. Appl. No. 11/158,315, mailed Jan. 26, 2009, 30 pages.
Interview Summary for U.S. Appl. No. 11/158,315, mailed Feb. 17, 2009, 2 pages.
Advisory Action for U.S. Appl. No. 11/158,315, mailed Apr. 15, 2009, 4 pages.
Non-Final Office Action for U.S. Appl. No. 11/158,315, mailed Jul. 9, 2009, 27 pages.
Non-Final Office Action for U.S. Appl. No. 11/158,313, mailed Nov. 14, 2008, 33 pages.
Notice of Allowance for U.S. Appl. No. 11/158,313, mailed Apr. 9, 2009, 14 pages.
Notice of Allowance for U.S. Appl. No. 09/728,453, mailed on Sep. 18, 2009, 16 pages. (Copy available to the Examiner via PAIR and accordingly not included with this IDS).
Interview Summary for U.S. Appl. No. 10/722,834, mailed on Sep. 9, 2009, 3 pages. (Copy available to the Examiner via PAIR and accordingly not included with this IDS).

* cited by examiner

```
<smil>
    <head>
        <meta name="title" content="Video Capture Demo" />
        <meta name="author" content="Pamela Gage" />
        <meta name="copyright" content=")1999 Ricoh Silicon
Valley, Inc"/>
        <layout type="text/smil-basic-layout">
            <region id="ImageChannel1" title="Iamage Channel1"
left="0" top="0" height="240" width="320" background-
color="#888888" fit="hidden"/>
        </layout>
    </head>
    <body>
        <par title="Video Capture Demo" author="Pamela Gage"
copyright="(c)1999 Ricoh Silicon Valley, Inc">
            <audio src="3_27_2000_16_44_27_vcapture.au"
begin="3s" id="Narration" title="Narration" alt="video Capture
narration" />
            <img src="3_27_2000_16_44_27_vcapture.rp" id="Slides"
region="Image Channel1" title=Slides"/>
        </par>
    </body>
</smil>
```

*Fig. 5*

```
<imfl>
<head duration="155714" bitrate="12000" title="Video Capture
    Demo" author="Pamela Gage" copyright=" (c)1999 Ricoh
    Silicon Valley" timeformat="milliseconds" width="320"
    height="240" aspect="true"/>
<image handle="1" name="3_27_2000_16_44_27_0001t.jpg"/>
<fill start="0" color="black"/>
<fadein start="0" duration="500" target="1"/>
<image handle="2" name="3_27_2000_16_44_27_0002t.jpg"/>
<crossfade start="22522" duration="500" target="2"/>
<image handle="3" name="3_27_2000_16_44_27_0003t.jpg"/>
<crossfade start="32887" duration="500" target="3"/>
<image handle="4" name="3_27_2000_16_44_27_0004t.jpg"/>
<crossfade start="52996" duration="500" target="4"/>
<image handle="5" name="3_27_2000_16_44_27_0005t.jpg"/>
<crossfade start="122907" duration="500" target="5"/>
</imfl>
```

*Fig. 6*

| word | file name | media type | pos |
|---|---|---|---|
| BACKGROUND | presentations/2000/3/160/160.html | keyframe | 2 |

*Fig. 7*

TECHNIQUES FOR CAPTURING INFORMATION DURING MULTIMEDIA PRESENTATIONS

CROSS-REFERENCES TO RELATED APPLICATIONS

The present application is a continuation of and claims priority from U.S. Non-Provisional patent application Ser. No. 09/728,560, now U.S. Pat. No. 7,167,191, filed Nov. 30, 2000 entitled "TECHNIQUES FOR CAPTURING INFORMATION DURING MULTIMEDIA PRESENTATIONS", which in turn claims priority from U.S. Provisional Patent Application No. 60/244,771, filed Oct. 31, 2000 entitled "TECHNIQUES FOR CAPTURING AND COMMUNICATING INFORMATION DURING A MULTIMEDIA PRESENTATION" and is a continuation-in-part application of U.S. Non-Provisional patent application Ser. No. 09/521,252, filed Mar. 8, 2000 now U.S. Pat. No. 7,299,405 entitled "METHOD AND SYSTEM FOR INFORMATION MANAGEMENT TO FACILITATE THE EXCHANGE OF IDEAS DURING A COLLABORATIVE EFFORT" and U.S. Non-Provisional patent application Ser. No. 09/714,785, now U.S. Pat. No. 6,976,032, entitled "A Networked Peripheral for Visitor Greeting, Identification, Biographical Lookup and Tracking" filed Nov. 15, 2000, which in turn claims priority from U.S. Provisional Patent Application No. 60/166,081, entitled "VISITOR KIOSK: A NETWORKED PERIPHERAL FOR VISITOR GREETING, IDENTIFICATION, BIOGRAPHICAL LOOKUP, AND TRACKING" filed Nov. 17, 1999. The entire contents of the afore-mentioned applications are incorporated herein by reference for all purposes.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the U.S. Patent and Trademark Office patent file or records, but otherwise reserves all copyright rights whatsoever.

The present application also incorporates by reference for all purposes the entire contents of U.S. Non-Provisional patent application Ser. No. 09/728,453, entitled "TECHNIQUES FOR RECEIVING INFORMATION DURING MULTIMEDIA PRESENTATIONS AND COMMUNICATING THE INFORMATION" filed Nov. 30, 2000.

BACKGROUND OF THE INVENTION

The present invention is related to communication and storage of multimedia information, and more particularly to techniques for capturing information related to multimedia presentations and storing the captured information in a plurality of formats for subsequent retrieval.

Multimedia presentations combining audio and video information are commonly used for communicating information in various environments such as commercial environments, academic environments, and others. For example, in a commercial environment, multimedia presentations may be used during meetings, during marketing presentations, etc. In academic environments multimedia presentations may be used for presenting information during lectures, class project presentations, etc. Conventionally, multimedia presentations are generally prepared using applications, such as Microsoft POWERPOINT, which store the multimedia presentation in an accessible format, e.g. a multimedia presentation file. The multimedia presentation file is typically stored on a device such as a laptop computer which can be carried to the presentation environment. The multimedia information contained in the multimedia presentation file (referred to as "multimedia presentation information") may then be presented by connecting the laptop computer to an output device and by "executing" or "opening" the multimedia file. "Executing" or "opening" the multimedia presentation generally causes information stored in the file, such as audio and video information, to be output via the output device.

The increasing popularity of multimedia presentations has also given rise to a need for recording the information presented during multimedia presentations to allow persons unable to attend the live presentation to be able to view the presentation at a later time. The recording also provides an archive which allows interested parties to review the presentation at a later time. Conventionally, archiving of presentations is typically done by storing a digital version of the multimedia presentation file. For example, for presentations prepared using Microsoft POWERPOINT, the "*.ppt" may be stored. A disadvantage of this technique is that anyone reviewing the presentation at a later time is typically required to use the same version of the application which was used to create the stored multimedia presentation. This may be difficult to satisfy at all times, especially when the presentation was prepared a long time ago and the application used to prepare the multimedia presentation is no longer available. Further, presentations prepared using applications running on a particular operating system, for e.g. Microsoft Windows, may not be reviewable by users using a UNIX based system. Additionally, due to their audio and video content, multimedia presentation files are typically very large, may contain many attachments, and thus consume valuable system and memory resources. Also, multimedia presentation files fail to capture audio information such as comments made by the presenter during the presentation and/or comments or questions asked by the attendees during the live presentation.

Another commonly used technique for recording multimedia presentations is to use a video camcorder. However, this technique also has several disadvantages. For example, a person is required to operate the video camcorder. Also, due to the location of the video camcorder with respect to the presentation, the video recording may not be of good resolution and clarity. Further, since the video camcorder equipment has to be placed right in front of the presentation to record the presentation, valuable space, which could have been occupied by the attendees, is now wasted by the video camcorder equipment. The line of sight of the video camcorder may also be inadvertently obstructed by attendees of the presentation. Also, since the information is stored on a video cassette, a user needs to have access to a video player to view information stored on the video cassette.

In light of the above, there is a need for a system which can record information during multimedia presentations without the disadvantages associated with conventional recording techniques. It is desirable that the system be able to record multimedia presentations in a non-intrusive manner, store the multimedia information using minimal resources, and to make the recorded presentation accessible via several different interfaces.

SUMMARY OF THE INVENTION

The present invention provides techniques for capturing information during multimedia presentations. According to an embodiment, the presentation recording appliance (PRA) receives multimedia presentation information from a first source. For example, the PRA may receive the multimedia presentation information after a multimedia presentation file is "executed" or "opened." The multimedia presentation information may comprise video information and/or audio information. The PRA may also receive information from external sources other than the first source. For example, the PRA may receive audio information from the presenter or from the attendees of the multimedia presentation. The audio and video information received by the PRA is then processed and stored in a format which facilitates subsequent retrieval.

According to an embodiment of the present invention, the PRA selects video keyframes from the video information received by the PRA. The PRA may also synchronize the selected video keyframes with the audio information received by the PRA. The audio and video information received by the PRA may also be processed to extract textual information from the audio and video information. The extracted information may be used for indexing purposes. Extraction of textual information from the audio and video information also enables key word searching of the information.

According to another embodiment of the present invention, the stored multimedia information may be accessed via a plurality of interfaces. According to a specific embodiment, the stored multimedia information may be accessed via a browser interface. Examples of other interfaces which may be used to access the information include a telephony interface, via a network interface, via a serial interface, and via other interfaces.

The foregoing, together with other features, embodiments, and advantages of the present invention, will become more apparent when referring to the following specification, claims, and accompanying drawings.

BRIEF DESCRIPTION OF THE DRAWINGS

FIG. 5 depicts an example of a SMIL file according to an embodiment of the present invention;

FIG. 6 depicts an example of a RealPix file for describing video keyframe tracks according to an embodiment of the present invention;

FIG. 7 depicts an example of an entry in an augmented inverted index according to an embodiment of the present invention;

DESCRIPTION OF THE SPECIFIC EMBODIMENTS

The present invention provides techniques for capturing information during multimedia presentations. The captured information may include information, such as audio and/or video information, stored in a multimedia presentation file and output via an output device. The term "multimedia presentation information" will be used to refer to information stored in a format, such as a multimedia presentation file (or other format), and output using one or more output devices. According to teachings of the present invention, the captured information may also include information from sources other than the multimedia presentation file (collectively referred to as "external sources"). For example, the captured information may include audio information from attendees of the multimedia presentation or the audio narration of the presenter of the multimedia presentation. According to an embodiment of the present invention, the captured information, including multimedia presentation information and information from external sources, is processed and stored in a format which facilitates efficient storage and retrieval.

FIGS. 1A, 1B, 1C, and 1D depict various environments which may incorporate an embodiment of the present invention. The embodiments of the present invention depicted in FIGS. 1A, 1B, 1C, and 1D are merely illustrative of the various configurations in which the present invention may be embodied and do not limit the scope of the invention as recited in the claims. One of ordinary skill in the art would recognize other variations, modifications, combinations, and alternatives.

Figure 1A:
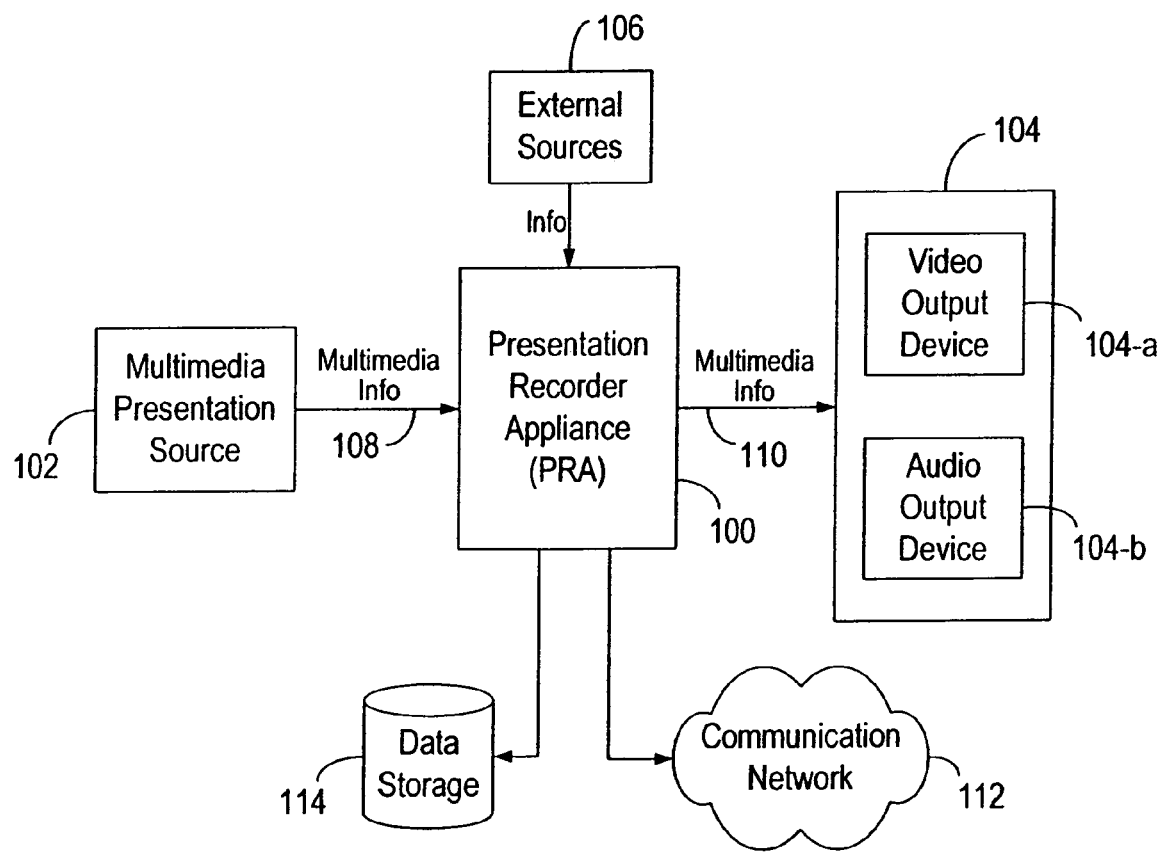
FIGS. 1A, 1B, 1C, and 1D depict various environments which may incorporate an embodiment of the present invention.

FIG. 1A depicts a presentation recorder appliance (PRA) 100 coupled to a multimedia presentation source (MPS) 102 via communication link 108 and to a presentation output device 104 via communication link 110. PRA 100 may also be coupled to communication network 112, data storage 114, and other devices or networks. MPS 102 is generally a device which is capable of storing or providing access to multimedia presentation information stored in a particular format. For example, MPS 102 may be a laptop or a data processing device which stores the multimedia presentation information in the form of a multimedia presentation file, e.g. a POWERPOINT "*.ppt" file.

MPS 102 may also be a network which stores the multimedia presentation information or a device which provides access to the multimedia presentation information via the network. For example, MPS 102 may be coupled to a networked system and be capable of accessing the multimedia presentation information via a communication link. The multimedia presentation information may include audio information, video information, other information, and/or combinations thereof.

Output device 104 provides a means for outputting or presenting the multimedia presentation information stored by or accessed by MPS 102. As shown in FIG. 1A, output device 104 may comprise a video output device 104-a and an audio output device 104-b. Video output device 104-a may be configured to output video and graphics information included in the multimedia presentation information. Examples of video output device 104-a include a screen, a monitor, a television, and other like devices. Audio output device 104-b may be configured to output audio information included in the multimedia presentation information. Examples of audio output device 104-b include one or more speakers, and other like devices. It should be apparent that various configurations of output device 104, having more or less components than those depicted in FIG. 1A, may be used in conjunction with the present invention. According to an embodiment of the present invention, output device 104 and MPS 102 may be embodied in a single device. For example, a laptop computer may be configured to store the multimedia presentation file and to output the multimedia presentation information when the file is "executed" or "opened."

According to the teachings of the present invention, PRA 100 may be configured to capture/record information presented during a multimedia presentation. The information captured or recorded by PRA 100 may include the multimedia presentation information stored or accessed by MPS 102 and information received from external sources during the presentation. In the embodiment depicted in FIG. 1A, PRA 100 is coupled to MPS 102 via communication link 108 and coupled to presentation output device 104 via communication link 110. PRA 100 may receive the multimedia presentation information from MPS 102 via communication link 108, store a copy of the multimedia presentation information before forwarding the multimedia presentation information to output device 104 via communication link 110. Communication links 108 and 110 depicted in FIG. 1A may be hardwire links, optical links, satellite or other wireless communications links, wave propagation links, or any other mechanisms for communication of information.

According to the teachings of the present invention, PRA 100 may also be configured to capture information from external sources 106 during the multimedia presentation. As stated above, external sources 106 may include the presenter, attendees of the presentation, and other sources. Examples of information received from external sources 106 include audio information from attendees of the presentation, audio narration of the person presenting the multimedia presentation, video information, and the like.

According to an embodiment of the present invention, PRA 100 processes the multimedia presentation information received from MPS 102 and information received from external sources 106 and stores it in a format suitable for subsequent storage and retrieval. The stored format thus stores a representation of the information received from MPS 102 and from external sources 106. The processing performed by PRA 100 may include digitizing the audio and video information streams contained in the captured information, selecting keyframes from the video stream for storage, synchronizing the video information with the audio information, storing the synchronized video and audio information in a format suitable for later retrieval, applying speech recognition techniques to the audio sources, applying optical character recognition techniques to the video information, indexing the stored information to facilitate storage and retrieval, and several other functions. Details related to the functions performed by PRA 100 are described below. PRA 100 may itself be comprised of several components and modules which perform the functions.

The information received and processed by PRA 100 may be stored on PRA 100 itself, or may be alternatively be stored on a data storage device 114 coupled to PRA 100 from where it can be accessed by a user for subsequent retrieval. The recorded information may be stored in a plurality of formats which can be accessed by the user using a variety of different interfaces. For example, the captured information may be accessed via a telephony interface, via a network interface, via a serial interface, and via other interfaces.

In a networked environment, the information received and processed by PRA 100 may be stored on one or more data storage devices coupled to communication network 112 from where the recorded information can be retrieved via a plurality of different interfaces. Communication network 112 may itself be comprised of many interconnected computer systems and communication links. While in one embodiment, communication network 112 is the Internet, in other embodiments, communication network 112 may be any suitable computer network.

Figure 1B:
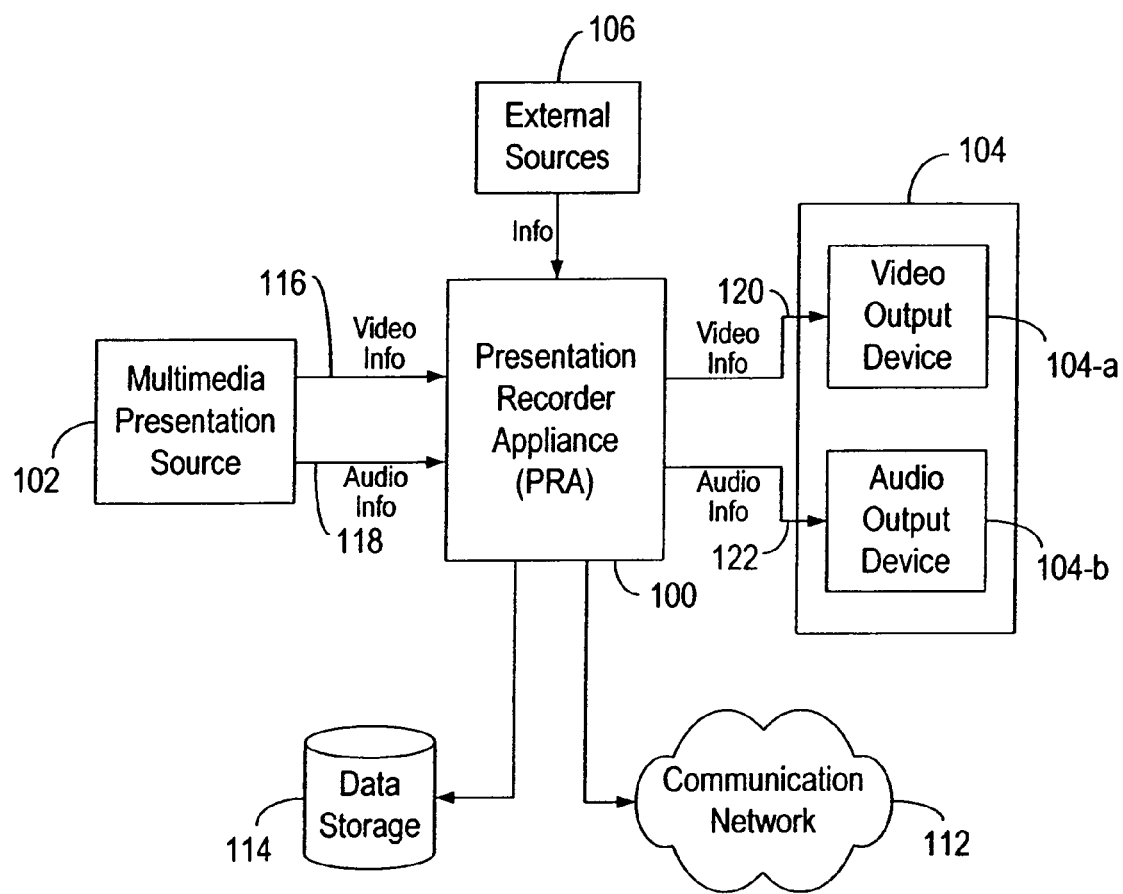

FIG. 1B depicts another embodiment of the present invention for capturing information during multimedia presentations. In the embodiment depicted in FIG. 1B, PRA 100 receives audio information included in the multimedia presentation information from MPS 102 via communication link 118, and receives video information included in the multimedia presentation information via communication link 116. According to a specific embodiment of the present invention, the video information may be communicated as a National Television System Committee ("NTSC") or a video graphics adapter ("VGA") compliant signal. However, other types of video and audio signals may also be used in conjunction with the present invention.

PRA 100 makes a copy of the audio and video information before forwarding the audio and video information to output device 104 via communication links 122 and 120, respectively. It should be apparent that in alternative embodiments of the present invention, various types of communication links may be used to communicate multimedia presentation information from MPS 102 to PRA 100 and from PRA 100 to output device 104. Communication links 116, 118, 120, and 122 depicted in FIG. 1B may be hardwire links, optical links, satellite or other wireless communications links, wave propagation links, or any other mechanisms for communication of information. Similar to the embodiment depicted in FIG. 1A, PRA 100 depicted in FIG. 1B may also receive information from external sources 106.

Figure 1C:
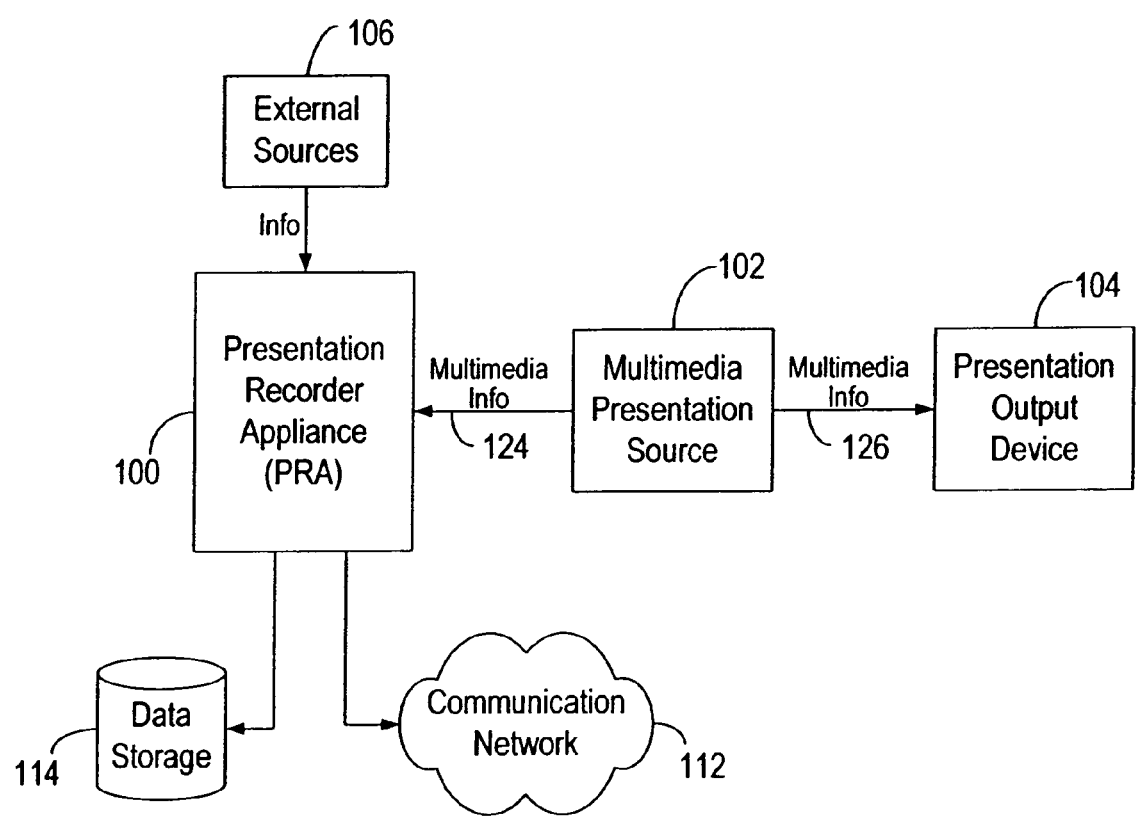

FIG. 1C depicts yet another embodiment of the present invention for capturing information during multimedia presentations. According to the embodiment depicted in FIG. 1C, PRA 100 receives the multimedia presentation information from MPS 102 via communication link 124, and output device 104 receives the multimedia information directly from MPS 102 via communication link 126. This type of configuration is generally used where communication links 124 and 126 are wireless communication links. However, communication links 124 and 126 may also be hardwire links, optical links, satellite links, wave propagation links, or any other mechanisms for communication of information. Similar to the embodiments depicted in FIG. 1A and FIG. 1B, PRA 100 depicted in FIG. 1C may also receive information from external sources 106.

Figure 1D:
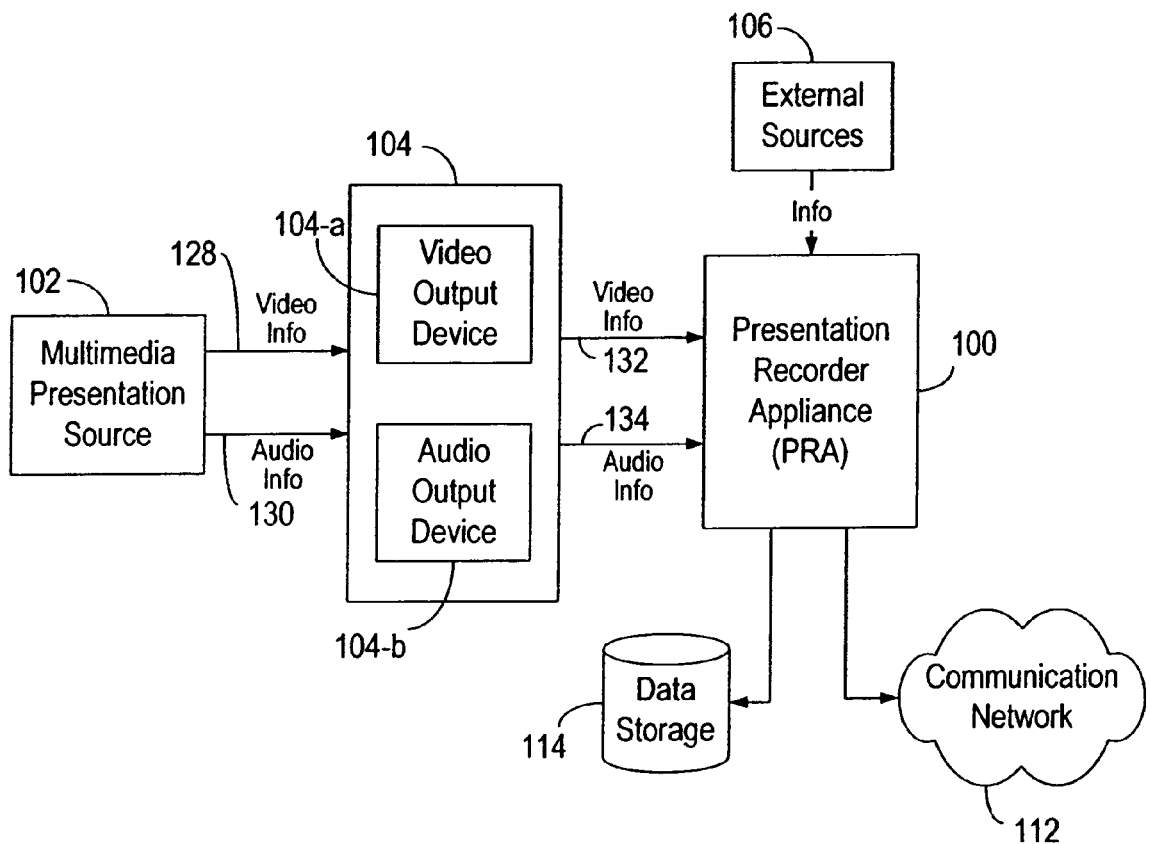

FIG. 1D depicts yet another embodiment of the present invention for capturing information during multimedia presentations. In the embodiment depicted in FIG. 1D, output device 104 receives audio and video information included in the multimedia presentation information directly from MPS 102 via communication links 130 and 128, respectively. Output device 104 may then process the information and then the processed audio and video information to PRA 100 via communication links 134 and 132. PRA 100 may also be configured to receive/capture information from external sources 106. In the configuration depicted in FIG. 1D, output device 104 may convert the various audio and video formats output by MPS 102 to a suitable standard format which is then forwarded to PRA 100. For example, output device 104 may convert a VGA signal format received from MPS 102 to a standard NTSC signal format and then communicate the NTSC signal to PRA 100. Since PRA 100 receives a standardized format, the design of PRA 100 is simplified since it no longer has to support the plurality of formats which may be output by MPS 102.

Figure 2:
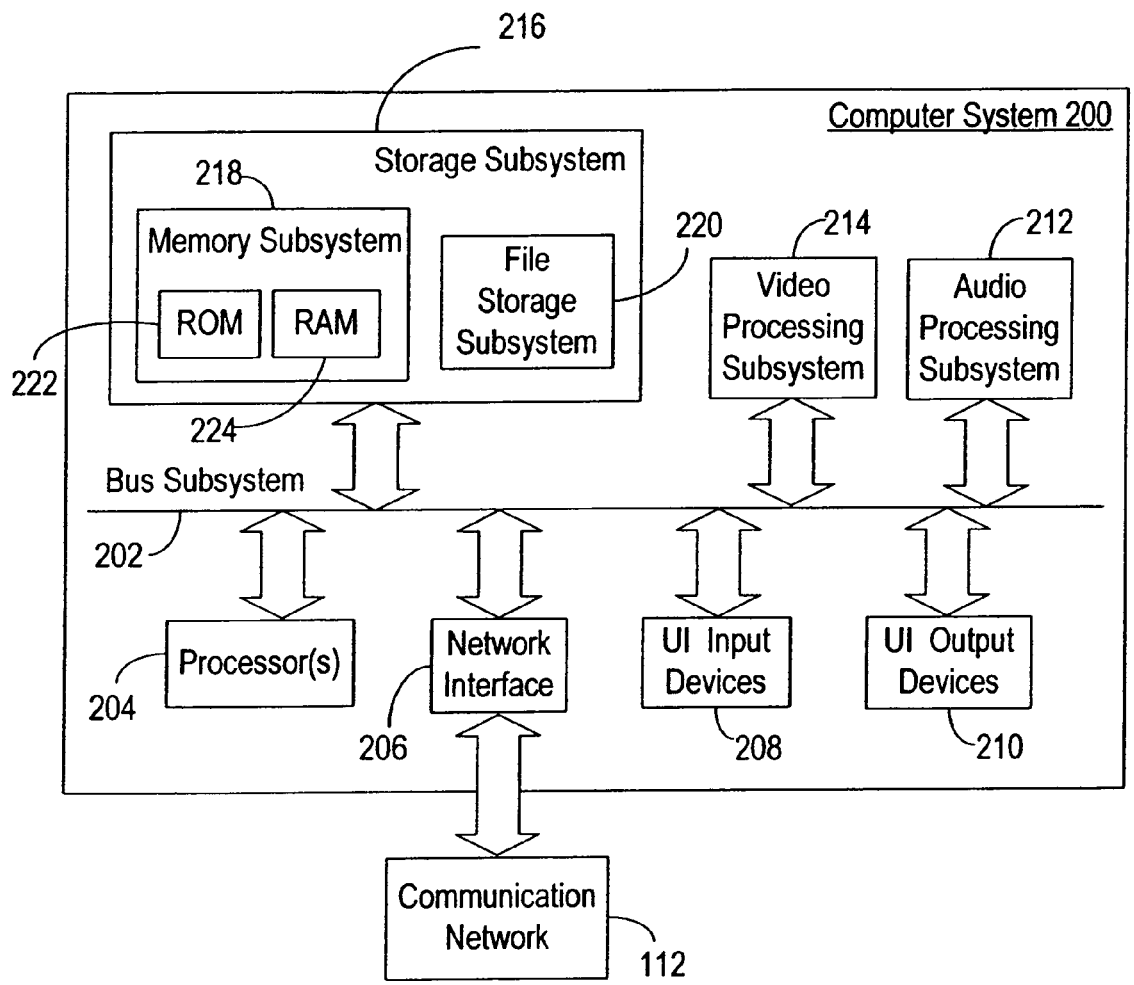
FIG. 2 is a simplified block diagram of a computer system suitable for use as a presentation recorder appliance according to an embodiment of the present invention.

FIG. 2 is a simplified block diagram of a computer system 200 suitable for use as a PRA 100 according to an embodiment of the present invention. Computer system 200 may include at least one processor 204 which communicates with a number of peripheral devices via bus subsystem 202. These peripheral devices may include a storage subsystem 216, comprising a memory subsystem 218 and a file storage subsystem 220, user interface input devices 208, user interface output devices 210, video processing subsystem 214, audio processing subsystem 212, and a network interface subsystem 206. The input and output devices allow user interaction with computer system 200. Network interface subsystem 206 provides an interface to outside networks, including an interface to communication network 112, and may be coupled via communication network 112 to corresponding interface devices in other computer systems, for example other PRAs. As previously stated, communication network 112 may itself be comprised of many interconnected computer systems and communication links. These communication links may be hardwire links, optical links, satellite or other wireless communications links, wave propagation links, or any other mechanisms for communication of information. While in one embodiment, communication network 112 is the Internet, in other embodiments, communication network 112 may be any suitable computer network.

User interface input devices 208 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 200. These devices may be used to control the operation of computer system 200.

User interface output devices 210 may include a display subsystem, a printer, a fax machine, or non-visual displays such as audio output devices. The display subsystem may be a cathode ray tube (CRT), a flat-panel device such as a liquid crystal display (LCD), or a projection device. The display subsystem may also provide non-visual display such as via audio output devices. In general, use of the term "output device" is intended to include all possible types of devices and ways to output information from computer system 200. These output devices may be used to receive status information and other feedback information from computer system 200.

Storage subsystem 216 stores the basic programming and data constructs that provide the functionality of the present invention. For example, the various modules for processing and recording multimedia information may be stored in storage subsystem 216. The multimedia information captured and processed by PRA 100 may also be stored in storage subsystem 216. These software modules are generally executed by processor 204.

Memory subsystem 218 may include a number of memories including a main random access memory (RAM) 224 for storage of instructions and data during program execution and a read only memory (ROM) 222 in which fixed instructions may be stored. File storage subsystem 220 provides persistent (non-volatile) storage for program and data files, and may include a hard disk drive, a floppy disk drive along with associated removable media, a Compact Digital Read Only Memory (CD-ROM) drive, an optical drive, or removable media cartridges. The databases and modules implementing the functionality of the present invention may be stored by file storage subsystem 220.

Audio processing subsystem 212 is responsible for capturing audio information received by computer system 200, and processing the audio information to facilitate storage of the captured audio information. Video processing subsystem 214 may be configured to capture video information, and to process and store the video information for subsequent retrieval.

Bus subsystem 202 provides a mechanism for letting the various components and subsystems of computer system 200 communicate with each other as intended. Although bus subsystem 202 is shown schematically as a single bus, alternative embodiments of the bus subsystem may utilize multiple busses.

Computer system 200 itself can be of varying types. Due to the ever-changing nature of computers, the description of computer system 200 depicted in FIG. 2 is intended only as a specific example for purposes of illustrating the preferred embodiment of the present invention. It should be apparent that many other configurations of PRA 100 are possible having more or less components than computer system 200 depicted in FIG. 2.

Figure 3:
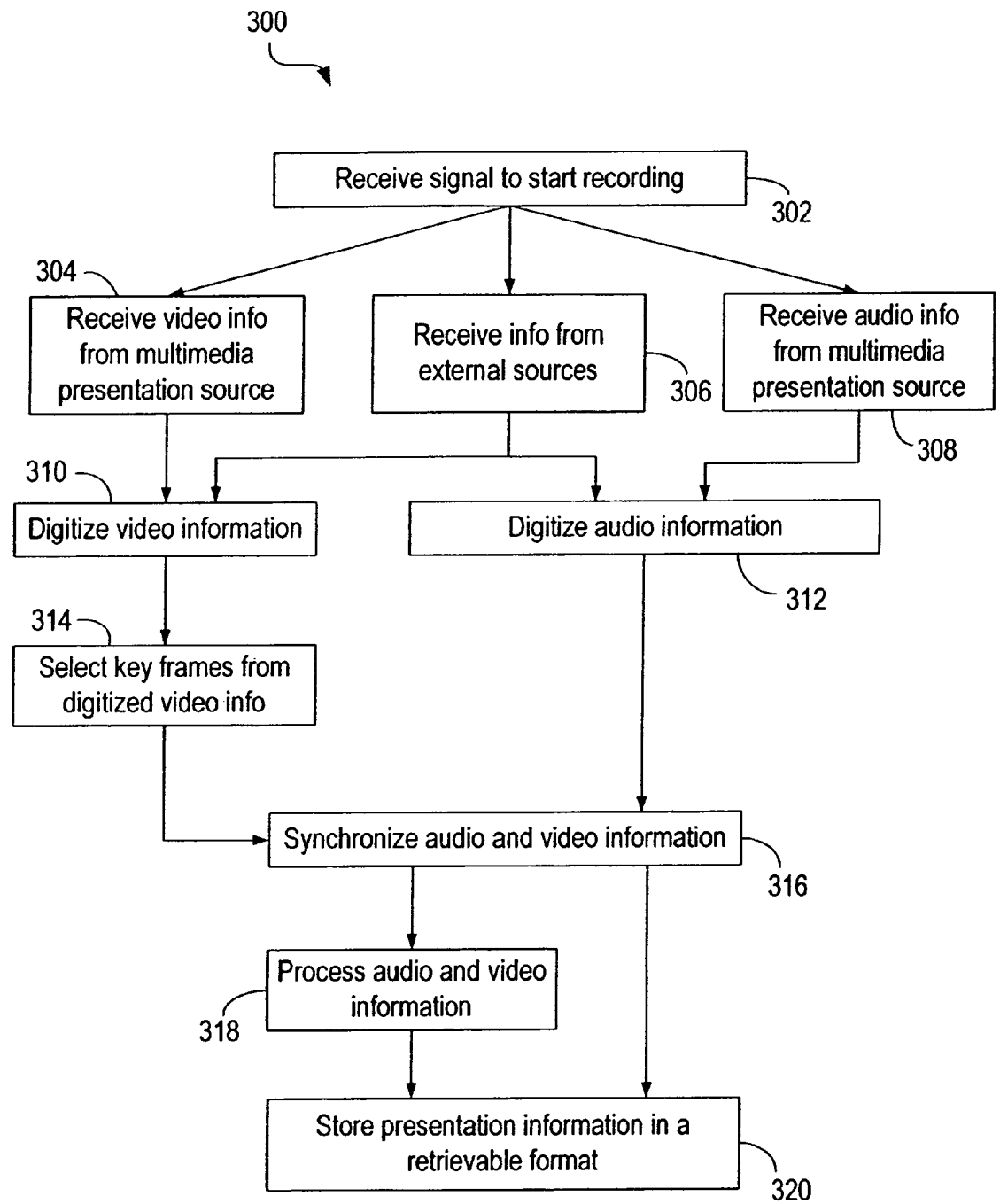
FIG. 3 is a simplified flowchart depicting processing performed by a presentation recorder appliance for capturing/recording information during a multimedia presentation according to an embodiment of the present invention.

FIG. 3 depicts a simplified flowchart 300 showing processing performed by PRA 100 for capturing/recording information during a multimedia presentation according to an embodiment of the present invention. As shown in FIG. 3, the process of capturing information during a multimedia presentation may be initiated when PRA 100 receives a signal to commence the recording (step 302). The signal may be communicated to PRA 100 using an input device of PRA 100, or alternatively may be communicated to PRA 100 via a remote device. In one embodiment of the present invention, PRA 100 may receive the signal to start the recording directly from MPS 102. For example, when a multimedia presentation file is "executed" or "opened" a signal may be automatically sent to PRA 100 from MPS 102 instructing PRA 100 to initiate the recording process. In a networked environment, the signal may also be received by PRA 100 via a network interface.

PRA 100 may then receive the multimedia presentation information, including video and/or audio information, from MPS 102 (steps 304 and 308), and receive information from the external sources (step 306). Steps 304, 308, and 306 may be performed in parallel. It should be apparent that step 304 is performed only if the multimedia presentation information includes video information, and likewise step 308 is performed only if the multimedia presentation information includes audio information. The information received from external sources may include, for example, audio information from the presenter of the information, audio information from the attendees of the presentation, for example questions or comments from the audience, audio and/or video information from other sources present during the presentation.

Steps 304, 308, and 306 may be performed during the duration of the multimedia presentation, or until PRA 100 receives a signal to stop the recording process. As with the signal to initiate the recording process, a signal to stop the recording process may be communicated to PRA 100 using an input device of PRA 100, or alternatively may be communicated to PRA 100 via a remote device. According to a specific embodiment of the present invention, PRA 100 may receive the signal to stop the recording directly from MPS 102, for example, after "execution" of the multimedia presentation file has completed or has been halted. In a networked environment, the signal may also be received by PRA 100 via a network interface. According to an embodiment of the present invention, the step of receiving information from external source may be performed even after steps 304 and 308 have been stopped. This allows the present invention to capture discussions etc. which may occur after execution of the multimedia presentation file has been completed or halted.

The information received by PRA 100 during steps 304, 308, and 306 may then be processed to enable storage and subsequent retrieval of the information. According to step 310, the video information received by PRA 100 is converted to a digital format or digitized (step 310). The audio information received by PRA 100 may also be digitized (step 312). Steps 310 and 312 may be performed only if the video and audio signals received by PRA 100 are in analog format. Steps 310 and 312 may not be performed if the video and audio signals received by PRA 100 are already in digital format.

PRA 100 may then select keyframes from the digitized video information for storage and discard the other frames (step 314). The selected frames are generally representative of a contiguous subset of video information. According to an embodiment of the present invention, PRA 100 only stores information related to the keyframes and discards other video information. In this manner, the amount of storage resources required for storage of the captured video information is reduced. In alternative embodiments of the present invention, for example, where storage resources are available in abundance, PRA 100 may also be configured to store information related to the keyframes as well as the other video information.

As indicated above, storing only the keyframes information reduces the storage resources required for storing the video information. For example, a typical video stream or sequence is composed of a large number of frames, typically 60 frames per second, and each frame may contain 640×480 pixels. Assuming each pixel is represented by a byte, 307,200 bytes would be required to store each 640×480 frame. A 1-hour video containing 216,00 frames would thus require a massive 66 GB of storage space to store the video information in an uncompressed format. Additionally, sequentially scanning through such a huge amount of stored video information to locate desired content is inconvenient and time consuming. By selecting a limited number of keyframes that are representative of a contiguous subset of video information, the present invention reduces the amount of required storage space. Further, the frames chosen during step 314 provide a convenient means for browsing the content of the captured video and indicate points in the video sequence where replay could be started.

Figure 4:
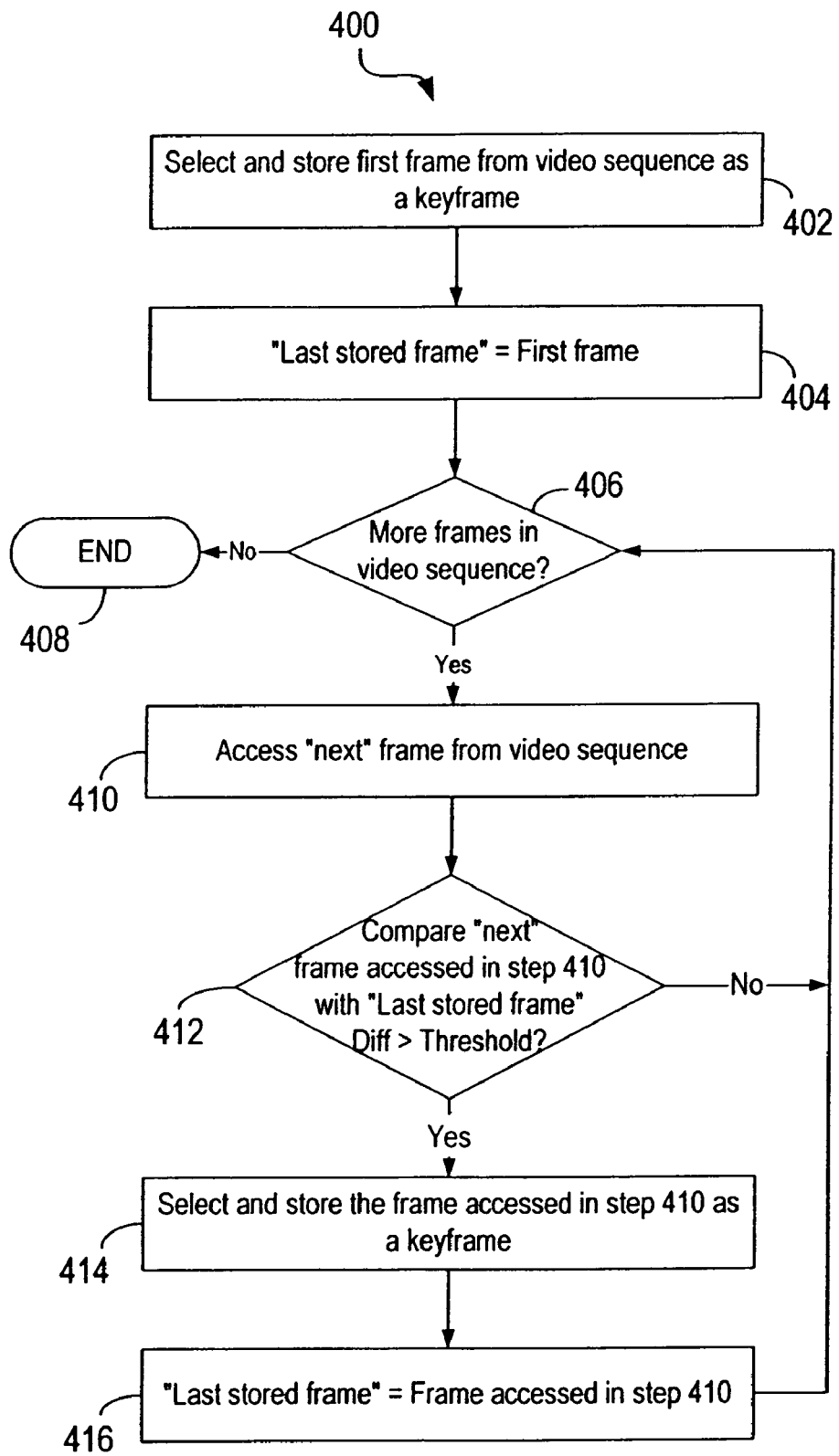
FIG. 4 is a simplified flowchart showing processing performed by a presentation recorder appliance for selecting keyframes according to an embodiment of the present invention.

FIG. 4 depicts a simplified flowchart 400 showing processing performed by PRA 100 for selecting and storing keyframes according to an embodiment of the present invention. As previously stated, a video sequence or stream comprises one or more video frames. According to flowchart 400 depicted in FIG. 4, PRA 100 compares sequential frames in the video sequence and selects and stores only those frames ("keyframes") that are significantly different from the previously selected frames. The keyframe selection process is initiated when the first frame from the captured video stream is selected and stored as a keyframe (step 402). The first frame is then identified or tagged as the "last stored frame" (step 404). For example, a variable "last_stored_frame" may be initialized to point to the first frame.

PRA 100 then determines if there are more frames existing in the video sequence (step 406). If there are no more frames, thereby indicating that all the frames in the captured video sequence have been processed, keyframe selection processing is terminated (step 408). If it is determined in step 406 that more frames exist, PRA 100 then accesses the next frame in the video sequence (step 410).

PRA 100 then compares the frame selected in step 410 with the frame identified or tagged as the "last stored frame" (or the frame pointed to by the "last_stored_frame" variable) (step 412). The comparison may involve determining the differences between the frames. Upon comparison, if the difference between the frame selected in step 410 and the "last stored frame" exceeds a user-configurable threshold, the frame selected in step 410 is selected and stored as a keyframe (step 414). The frame selected and stored in step 410 is then designated as the "last stored frame" (the "last_stored_frame" variable is updated to point to the frame stored in step 410). Processing then continues with step 412. If however, the difference between the frames does not exceed the threshold value, then processing continues with step 406.

The comparison performed in step 412 is an important determiner of system performance. If the comparison results in too many frames being selected, a large amount of storage space will be used for storage of the video information and browsing the keyframes will be inefficient (almost like replaying the entire video stream). On the other hand, if the comparison results in too few keyframes being selected and stored, even though a large storage reduction is achieved, important information in the content of the video stream may be missed. The comparison threshold value should be properly configured to obtain optimal comparison such that an appropriate number of keyframes are selected as keyframes.

According to an embodiment of the present invention, several different methods may be used for comparing frames. These include image-based comparison methods, text-based comparison methods, comparison methods based on external stimulus, comparison methods based on environmental measurements, time-based sampling methods, combinations of the aforementioned methods, and others.

According to an embodiment of the present invention using an image-based comparison method, PRA 100 uses characteristics of the image pixels of the two frames being compared to decide whether the frames are different. According to one technique, PRA 100 calculates the sum of the differences between corresponding pixels in the two frames being compared. If this value exceeds a use-configurable preset threshold value, the frames are identified to be different from one another, and the frame accessed in step 410 is stored as a keyframe. The differences may be raised to the Nth power before being added to an accumulator. Another embodiment may apply an image processing operator to the two frames before calculating the sum of the differences. An example of such an operator is an edge detector (e.g. the Sobel detector described in R. O. Duda and P. E. Hart, *Pattern Classification and Scene Analysis*, J. Wiley, New York, 1973, the contents of which are herein incorporated by reference in their entirety for all purposes).

According to another embodiment of the present invention, PRA 100 may use optical character recognition (OCR) text-based methods to compare the frames in step 412 of flowchart 400. Using this technique, PRA 100 can detect changes in words between two frames which might be very difficult to detect using only image-based comparison methods. For example, PRA 100 may detect a word "true" being changed to "false" in the frames being compared. Using a text-based comparison method, PRA 100 may decide that the two frames are different if they contain more than a fixed number of characters that are different. According to a specific embodiment of the present invention, in order to provide tolerance to OCR errors, the threshold may require that the characters that are different from each other in the two frames be contiguous.

According to another embodiment of the present invention, PRA 100 may be configured to select and store a frame upon receiving stimulus or signal from MPS 102 or some other signal source. According to an embodiment of the present invention, a serial connection may be provided between MPS 102 and PRA 100. This connection may be used to carry information from MPS 102 (e.g. from a keyboard or mouse coupled to MPS 102, from a software application running on MPS 102, etc.) to PRA 100 indicating when a new slide or frame is displayed. For example, every time a user touches the keyboard, moves or clicks a mouse, or explicitly causes the software application that is displaying the multimedia presentation to advance to the next frame, the next frame may be saved as keyframe. According to another embodiment of the present invention, this method of keyframe selection may be coupled to a video buffer that continuously retains "N" seconds of video. When an external stimulus is received by PRA 100, more than one keyframe may be chosen from the buffer—e.g., "M" seconds before the stimulus and "M" seconds after the stimulus.

According to another embodiment of the present invention, keyframe selection may also be done based on signals received from sensors attached to MPS 102, PRA 100, output device 104, or to other devices. For example, sensors such as video cameras mounted on output device 104 or MPS 102 may detect when the person making the presentation gestures towards the device. Even though the person may not actually touch the device, such a motion may indicate that the person is drawing attention to the material output via output device 104. Accordingly, PRA 100 may be configured to select and store a frame when such a gesture is made upon receiving a signal in response to the gesture from the device, e.g. a video camera. According to another technique, PRA 100 may receive an environmental measurement from a device such as a microphone mounted on MPS 102, PRA 100, output device 104, or elsewhere. When the speaker's volume increases, this may indicate that the speaker is facing towards the microphone while speaking, and video frames during this period may be selected as keyframes and stored.

According to another embodiment of the present invention, as an adjunct to the above described methods, PRA 100 may be configured to select and store keyframes at a fixed sampling interval (e.g. every 2 minutes) during times when the other methods do not choose any frames. This may help provide a level of error tolerance in that if the other methods fail to detect a significant difference, the time-based sampling will at least capture some data.

Several combinations of the above-described comparison methods may be used by PRA 100 in alternative embodiments of the present invention. According to an embodiment of the present invention, PRA 100 may apply all the above mentioned methods in parallel and store all the frames output by the methods as keyframes. According to another embodiment of the present invention, PRA 100 may be configured to apply all the above mentioned methods in parallel and store a frame only when "M" out of "N" methods select the frame as a keyframe.

Referring back to FIG. 3, PRA 100 may synchronize the captured video information (or the selected video keyframes) and the digitized audio information (step 316). The video keyframes and audio tracks are synchronized so that when the recorded multimedia information is played back, the keyframes and audio tracks will be played in sync as they originally occurred. According to an embodiment of the present invention, synchronization may be accomplished by recording a timestamp when each keyframe is captured and stored and at the beginning of each sound track. The timestamp may encode the current date and time, perhaps to fractions of seconds.

For synchronization purposes, clock initialization is generally not an issue when the video and audio data are captured by using the same processor as that processor's clock may be used for the timestamp, e.g. when PRA 100 uses a single processor to capture the information. However, if the video information and any of the audio tracks are captured using different processors, then special synchronization procedures have to be performed if the clocks of the various processors are not set to the same time. These special synchronization procedures may include designating one of the processors (typically, the processor that performs video capture) as the "master." At startup time the difference in time between the master's clock and the non-master clocks is recorded. The difference value is then used by the non-master systems to calculate and output master-adjusted timestamps. Alternatively, the non-master systems may query the master for its clock value before generating a timestamp. While this method may increase the communication costs, it compensates for differences in clocks that become more evident over time.

Synchronizing or cross-referencing the selected video frames with the audio information allows a user to retrieve sections of the multimedia presentation and hear the audio associated with the sections. For example, when a software application is used to playback the information recorded and stored by PRA 100, the software application may monitor the timestamps associated with the video and audio information to output the information at appropriate times.

Synchronization also allows a user to randomly access the stored information. For example, a control-such as a slider control which can be dragged along a time line may be provided by a software application used to retrieve the stored information. The software application may map the position of the slider to a discrete time between the beginning and end of the multimedia presentation. The keyframe displayed at that discrete time may be displayed. The audio track may also be advanced or rewound to the same time and output to the user. According to an embodiment of the present invention, the audio streams may be broken down into subsequences or "chunks" where each chunk starts and ends when a keyframe is captured. A user may be allowed to select where to begin replay of the presentation by selecting a keyframe and the audio corresponding to that keyframe may be output.

According to an embodiment of the present invention, the synchronization data for information captured during a multimedia presentation, including the timestamps for the audio and keyframe tracks, may be stored/represented in several ways. According to a specific embodiment of the present invention, a Synchronized Multimedia Interface Language (SMIL) format file may be used to name the audio and video tracks. FIG. 5 depicts an example of a SMIL file for a multimedia presentation that includes one audio track and five keyframes. A RealPix file, shown in FIG. 6, may be used to describe the video keyframe track. The file contains the names of the individual JPEG images and the times during the replay when they should be displayed.

Referring back to FIG. 3, PRA 100 may then store the audio and video information in a format which facilitates retrieval (step 320). The multimedia information may be stored in a plurality of formats which may be retrieved by a user using a plurality of different interfaces. For example, the multimedia information may be stored as an HTML document which may be accessed by a user via a network interface using a web browser. Other formats in which the presentation may be stored include Synchronized Multimedia Interface Language (SMIL) format, HTML+Time format, Flash format, Quicktime format, text format, and other formats which can be used to represent recorded presentations, and the like.

Alternatively, the audio and video information may be subjected to further processing (step 318). For example, the video information may be processed to extract textual information and image information from the video information. According to an embodiment of the present invention, optical character recognition (OCR) techniques may be applied to extract textual and other content information from the video information. The extracted information may be indexed and annotated to the video information to facilitate full text retrieval and keyword search capabilities for the video information. Indexing and cross-referencing of the textual information with the video information allows a user to retrieve sections of the video information based on textual information.

Audio information may also be processed in a manner similar to the video information. For example, voice recognition techniques may be applied to the audio information to recognize sources of the audio information, e.g. identify the speakers of the audio information, and to extract textual information from the audio information. According to an embodiment of the present invention, transcripts may be generated corresponding to the audio information. Results from the voice recognition analysis may be annotated and cross-indexed with the audio information. This allows retrieval of segments of the audio information and their related textual information. Extraction of text information from the audio information also facilitates full text indexing and keyword searching capabilities on the audio information.

The results obtained from applying OCR techniques to the video keyframes and applying speech recognition techniques to the audio information may be indexed for full text retrieval. Such indexing allows a user to access video or audio information using keyword search techniques. For example, a user may provide a keyword to an application used for retrieving the multimedia information, and the application may output video and audio information containing the keyword.

According to an embodiment of the present invention, an "inverted index" may be used for indexing purposes. An inverted index contains a list of words that occur in the various multimedia presentations captured by PRA 100, the filenames (which may be used for storing the information captured) in which the words occur, and the position within the files where the words occur. The inverted index may be augmented with information indicating the media type for each indexed word. This information allows a software application used for retrieving the information to treat the different media types differently.

FIG. 7 shows an example of an entry in an augmented inverted index. The media type 702 may be a document, a keyframe, audio, video, and the like. If media type 702 is a document, "position" 704 may refer to the specific byte in the document file. If media type 702 is keyframe, position 704 may refer to the number of the keyframe. If media type 702 is audio or video, position 704 may refer to a position in time in the stream.

The multimedia information stored by PRA 100 may be subsequently accessed by a user via a plurality of interfaces. The interfaces may include a phone interface which may be used to access audio information from the recorded multimedia information. The recorded information may be also be accessed via a serial interface using a modem. PRA 100 may also be configured to store the recorded information in a format which is specialized for a particular type of retrieval device or a particular type of software application used for retrieval. For example, if a personal data assistance (PDA) such as a Palm Pilot were used to retrieve the stored information, PRA 100 may be configured to store the information in a storage format specialized for the PDA using reduced-resolution versions of the selected video keyframes.

Figure 8:
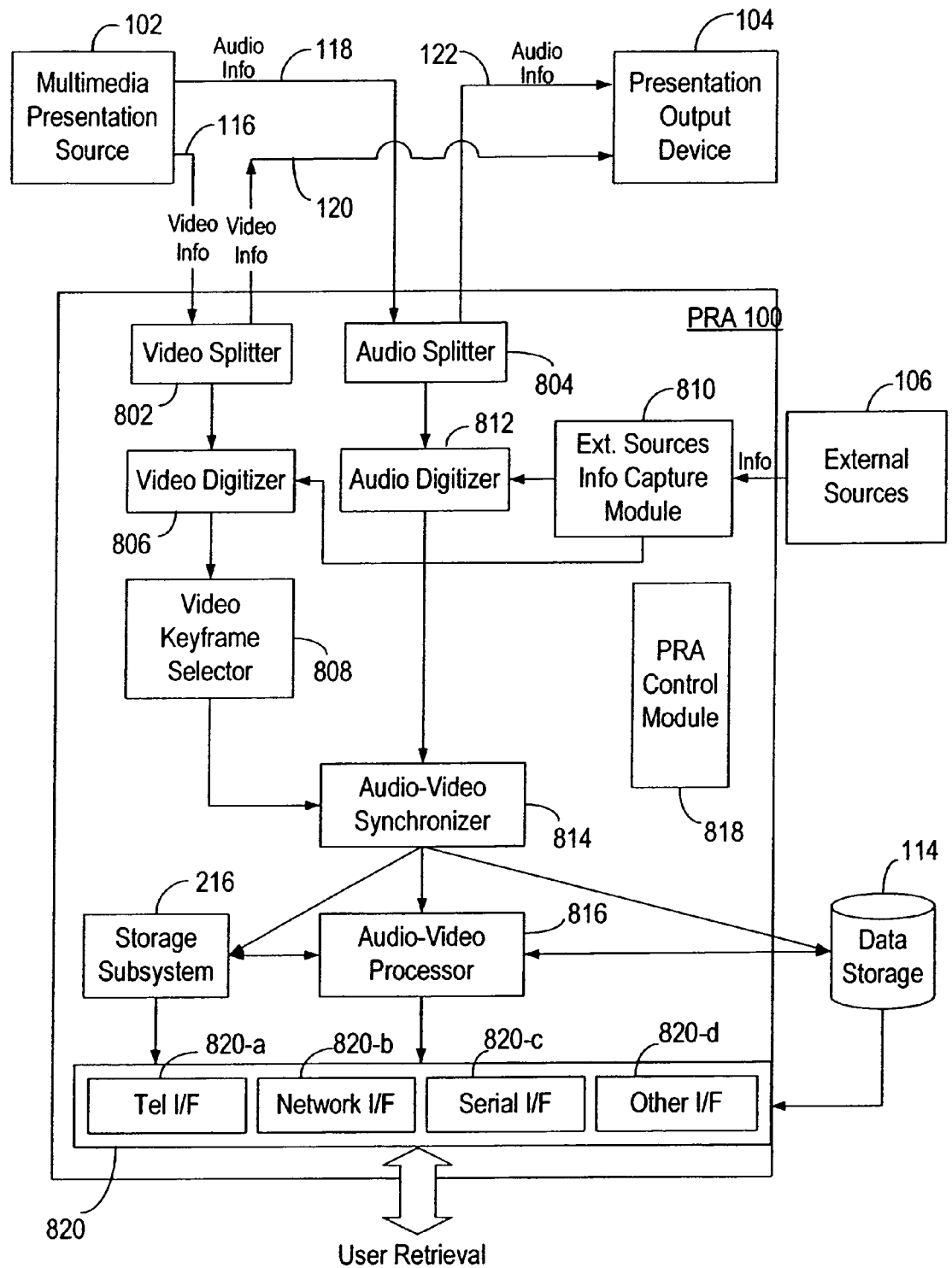
FIG. 8 depicts various modules for recording information during multimedia presentations according to an embodiment of the present invention.

FIG. 8 depicts various modules for recording information during multimedia presentations according to an embodiment of the present invention. The modules depicted in FIG. 8 include a video splitter module 802, an audio splitter module 804, a video digitizer module 806, an audio digitizer module 812, an external sources information capture module 810, a video keyframe selector module 808, an audio-video synchronizer module 814, an audio-video processor module 816, an interface module 820, and a PRA control module 818. FIG. 8 also depicts storage subsystem 216 (also shown in FIG. 2) which may be used to store information used by or generated by PRA 100. The modules depicted in FIG. 8 may be implemented in hardware or software or combinations thereof. The software modules may be executed by one or more processors in PRA 100.

According to the embodiment shown in FIG. 8, PRA 100 is coupled to MPS 102 via communication links 118 and 116, and to presentation output device 104 via communication links 120 and 122 (similar to the configuration depicted in FIG. 1B). PRA 100 receives video information from MPS 102 via communication link 116 and receives audio information from MPS 102 via communication link 118. Video splitter module 802 makes a copy of (or splits) the video information received from MPS 102 before forwarding the received video information to presentation output device 104 via communication link 120 for output via a video output device. Likewise, audio splitter module 102 makes a copy of (or splits) the audio information received from MPS 102 before forwarding the received audio information to presentation output device 104 via communication link 122 for output via an audio output device. The copied (or split) video and audio streams are forwarded to video digitizer module 806 and audio digitizer module 812 respectively for further processing.

External sources information capture module 810 receives information/signals, for example, audio information, from external sources 106. As previously mentioned, the information from external sources 106 may include for example the audio narration of the presenter, questions or comments from the presentation attendees, and audio signals from other sources. External sources information capture module 810 generally includes one or more listening devices such as microphones which capture audio information from the external sources. The captured audio information is forwarded to audio digitizer module 804 for further processing. According to alternative embodiments of the present invention, external sources information capture module 810 may also include a video camera to capture video information from external sources. The video information captured from external sources 106 is forwarded to video digitizer module 806 for further processing.

Video digitizer module 806 is responsible for converting analog video signals to a digital format. The digitized video information is then forwarded to video keyframe selector module 808 for further processing. Audio digitizer module 812 is responsible for converting analog audio signals to a digital format. The digitized audio information is then forwarded to audio-video synchronizer module 814 for further processing. As previously stated, audio and/or video digitizing may not be required if the audio and video information received from MPS 102 or from external sources 106 is already in digital format.

Video keyframe selector module 808 is responsible for processing the digitized video information to select keyframes from the video information and to discard the other frames. As mentioned above, selection of keyframes rather than all the frames reduces the amount of memory needed for storage of the video information. This in turn reduces the amount of resources needed to store the multimedia presentation information. Various techniques which may be used by the present invention to select keyframes have been described above.

Audio-video synchronizer module 814 is responsible for receiving information related to the video keyframes selected by video keyframe selector module 808 and synchronizing the keyframes with digitized audio information received from audio digitizer 812. As previously mentioned, synchronizing or cross-referencing the selected video frames with the audio information allows a user to retrieve sections of the multimedia presentation and hear the audio associated with the sections.

According to an embodiment of the present invention, the synchronized audio and video information may be stored by audio-video synchronizer module 814 in storage subsystem 216, data storage 114, or some other storage location. The stored information may then be accessed by a user in various formats using different interfaces 820.

According to another embodiment of the present invention, the audio-video information may then be forwarded to audio-video processor 816 for further processing. Audio-video processor 816 may comprise a single processor or a plurality of processors. The processing performed by audio-video processor 816 may include extraction of textual information from the video and audio information, cross-referencing or indexing the extracted textual information with the video/audio information, and other types of processing. Various techniques such as OCR techniques and voice recognition techniques, as described above, may be used to facilitate extraction of textual and other information from the audio and video information. Other known signal processing techniques may also be used by audio-video processor 816 to extract information from the audio and video information.

The multimedia information and the information extracted by audio-video processor 816 may then be stored in a plurality of formats to facilitate subsequent retrieval by a user. As stated above, various different formats may be used for storing the information including SMIL format, HTML+Time format, Flash format, Quicktime format, text format, and other formats which can be used to represent recorded presentations. The recorded multimedia information may be stored in storage subsystem 216, or in data storage device 114 coupled to PRA 100. The information may also be stored on data storage devices (not shown in FIG. 8) coupled to PRA 100 via communication network 112. Audio-video processor 816 may use encoding and compression techniques to minimize the number of resources needed for storing the information.

Interface module 820 enables a user to access the recorded information stored by PRA 100 via a plurality of interfaces. These interfaces may include a telephone interface 820-*a*, a network interface 820-*b*, a serial interface 820-*c*, and other interfaces 820-*d*. Other interfaces 820-*d* may include interfaces which allow information to be retrieved via a cellphone, via a PDA, and other like communication techniques.

PRA control module 818 is configured to provide mechanisms for controlling the functionality of PRA 100. For example, PRA control module 818 may provide controls to instruct PRA 100 to start or stop the recording process. The start/stop controls may be activated using input devices coupled to PRA 100 or other devices such as remote control devices. PRA control module 818 may also include controls for playing back the recorded information using output devices coupled to PRA 100. Other controls typically associated with video and audio equipment may also be included in PRA control module 116. Status information related to PRA 100 may also be displayed or output using PRA control module 818.

The modules depicted in FIG. 8 are merely illustrative of an embodiment of the present invention and do not limit the scope of the invention as recited in the claims. One of ordinary skill in the art would recognize other variations, modifications, combinations, and alternatives.

Figure 9A:
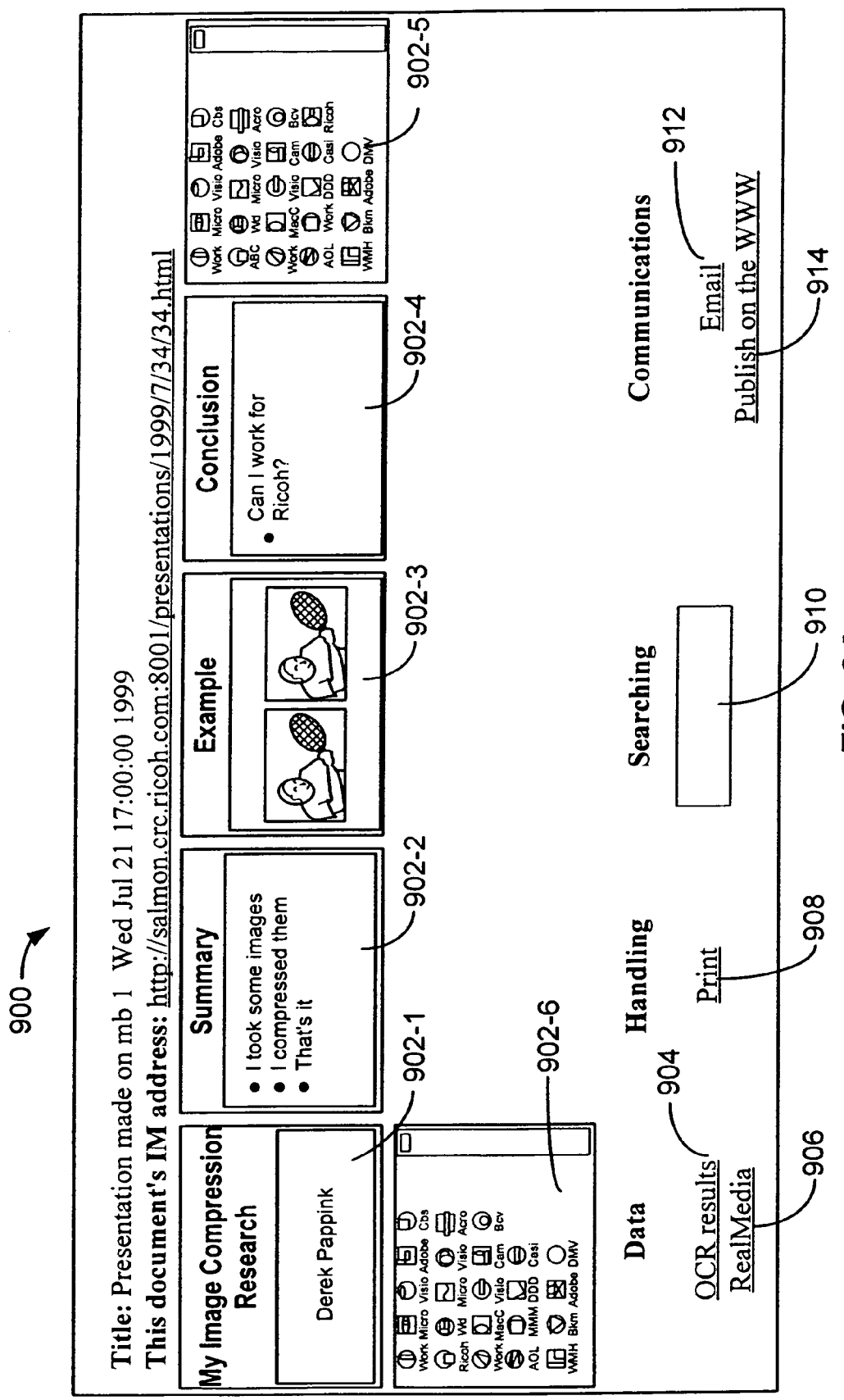
FIGS. 9A and 9B depict a user interface for retrieving the recorded multimedia information according to an embodiment of the present invention.
Figure 9B:
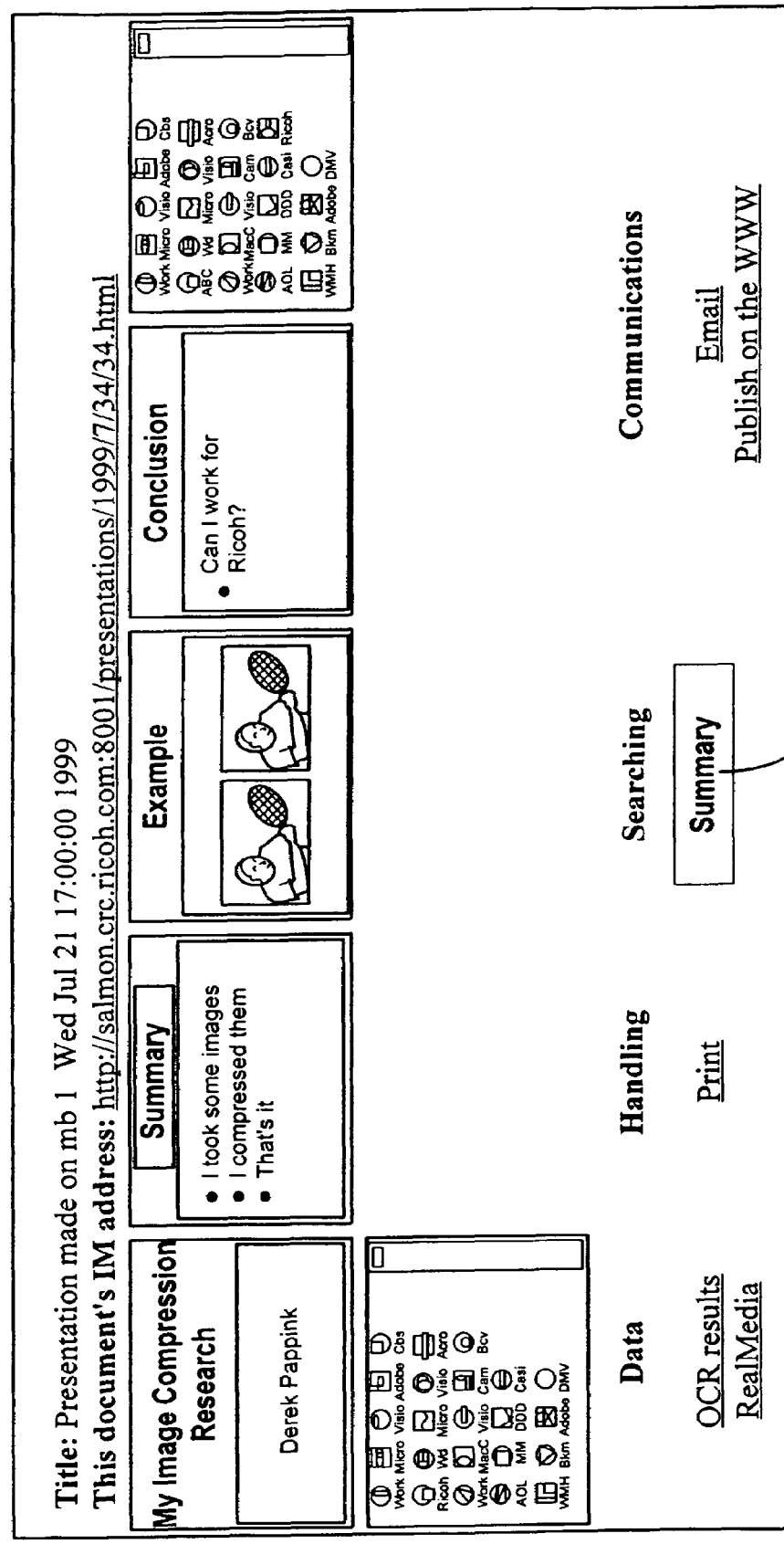

FIGS. 9A and 9B depict a user interface 900 for retrieving the recorded multimedia information according to an embodiment of the present invention. User interface 900 may be used in conjunction with a web browser and may connect to a web server process executing on PRA 100. For example, user interface 900 may be presented as a web page. User interface 900 may allow a user to access the stored multimedia information, browse the information, search the stored information, randomly access contents of the stored information based on date, time, etc., perform text-based searches, and perform other functions.

As described above, according to an embodiment of the present invention, information related to each individual presentation may be stored in HTML format that is derived from the SMIL format. According to this embodiment, the HTML may include thumbnail images of the keyframes and links to other media types, and computational methods that enable various communication methods. For example, user interface 900 depicted in FIG. 9A displays a presentation in which six keyframes 902-1, 902-2, 902-3, 902-4, 902-5, and 902-6 corresponding to the multimedia presentation are displayed. User interface 900 also includes several features for accessing information corresponding to the presentation. For example, a user may invoke a media player application, such as a Windows Media Player or a RealMedia Player, by clicking or selecting the "Real Media" button/hypertext link 906. The media player invoked upon selecting button 906 may be used to replay the presentation as a video and play the accompanying audio. Selecting "OCR results" 904 button/link allows the user to access results of OCR techniques associated with the presentation. The user may print information related to the presentation by selecting "Print" button/link 908. The user may publish information related to the presentation by selecting "Publish on the WWW" button/link 914. The user may email the presentation information by selecting "Email button/link 912.

User interface 900 may also include a text search window 910 which allows the user to search the presentation information. Text typed in window 910 is converted to queries that may be matched against, for example, the augmented inverted index described above. Filenames of documents that match the queries and the corresponding HTML representations of the documents may be returned to the user together with an indication of the medium that contained the query text. For example, in response to the user typing the "Summary" in window 910 (as shown in FIG. 9B), a section of keyframe 902-2 containing the word "Summary" may be highlighted as shown in FIG. 9B. Search terms in an audio soundtrack may be expressed by outlining the closest keyframe. Alternatively, user interface 900 may display the transcript of the audio track in which the search terms occur with the search terms highlighted. Users may click on the highlighted terms in the transcript and the video associated with the presentation may be played from that time. Alternatively, according to an embodiment of the present invention, a snippet of the audio track containing the search term may be played. The transcript or audio snippet may be linked to a media player. Various other techniques may also be used to present the results of a search query to the user.

User interface 900 depicted in FIGS. 9A and 9B is merely illustrative of an embodiment of the present invention and does not limit the scope of the invention as recited in the claims. One of ordinary skill in the art would recognize other variations, modifications, combinations, and alternatives.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps.

Further, while the present invention has been described using a particular combination of hardware and software, it should be recognized that other combinations of hardware and software are also within the scope of the present invention. The present invention may be implemented only in hardware, or only in software, or using combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the invention as set forth in the claims.

What is claimed is:

1. A method performed by a presentation recorder appliance of recording information during a multimedia presentation, the method comprising:
    receiving video information at the presentation recorder appliance, the video information captured from a first source in one or more information sources;
    receiving audio information at the presentation recorder appliance, the audio information captured from one of the one or more information sources;
    automatically analyzing, at the presentation recorder device, the video information to select a set of one or more video frames from the video information;
    automatically analyzing, at the presentation recorder device, one or more of the set of one or more video frames to extract, based on one or more text recognition techniques, text information from the set of one or more video frames;
    automatically analyzing, at the presentation recorder device, the audio information to extract text information from the audio information;
    storing the set of one or more video frames and the audio information in a storage device associated with the presentation recorder appliance to create stored information;
    automatically indexing at the presentation recorder appliance the stored information using the text information extracted from the set of one or more video frames to generate an index between the textual information extracted from the set of video frames and the stored information;
    automatically indexing at the presentation recorder device the stored information using the text information extracted from the audio information to generate an index between the text information extracted from the audio information and the stored information; and
    providing at the presentation recorder appliance access to the stored information based on the index between the textual information extracted from the set of video frames and the stored information and the index between the text information extracted from the audio information and the stored information.

2. The method of claim 1 wherein automatically analyzing, at the presentation recorder device, one or more of the set of one or more video frames to extract the text information from the set of one or more video frames comprises applying an optical character recognition technique at the presentation recorder appliance to the set of one or more video frames to extract the text information.

3. The method of claim 1 wherein automatically analyzing, at the presentation recorder device, the audio information to extract the text information from the audio information comprises using at least one of voice recognition or audio transcription at the presentation recorder appliance to extract the text information from the audio information.

4. The method of claim 1 wherein receiving the audio information at the presentation recorder appliance comprises capturing the audio information at the presentation recorder appliance using an audio information capture device.

5. The method of claim 1 wherein receiving the audio information at the presentation recorder appliance comprises capturing audio information from a second source in the one or more information sources, wherein the second source is different from the first source.

6. The method of claim 5 wherein the second source is a person.

7. The method of claim 1 wherein receiving the audio information at the presentation recorder appliance comprises capturing audio information from the first source.

8. The method of claim 1 further comprising automatically synchronizing at the presentation recorder appliance the set of one or more video frames and the stored audio information.

9. The method of claim 1 wherein receiving the video information at the presentation recorder appliance comprises capturing the video information at the presentation recorder appliance while contents of a file are displayed by the first source.

10. The method of claim 9 wherein the file comprises a multimedia presentation file.

11. The method of claim 10 wherein the multimedia presentation file is a file created using a Microsoft Powerpoint application.

12. The method of claim 9 wherein capturing the video information at the presentation recorder appliance is automatically initiated by the presentation recorder appliance upon opening of the file on the first source.

13. The method of claim 1 further comprising:
    receiving a search term at the presentation recorder appliance;
    identifying at the presentation recorder appliance a portion of the stored information comprising the search term based on the index; and
    outputting from the presentation recorder appliance the portion of the stored information.

14. The method of claim 13 wherein:
    identifying at the presentation recorder appliance the portion of the stored information comprising the search term comprises identifying at the presentation recorder appliance at least one video frame from the set of one or more video frames that comprises the search term; and
    outputting from the presentation recorder appliance the portion of the stored information comprises outputting from the presentation recorder appliance highlighting information associated with the at least one video frame, wherein the highlighting information is configured to highlight an occurrence of the search term in the at least one video frame when the at least one video frame is displayed on a display device.

15. The method of claim 13 wherein:
identifying at the presentation recorder appliance the portion of the stored information comprising the search term comprises identifying at the presentation recorder appliance a portion of the stored audio information that comprises the search term; and
outputting from the presentation recorder appliance the portion of the stored information comprises outputting from the presentation recorder appliance the portion of the stored audio information or a transcript of the portion of the stored audio, wherein an occurrence of the search term in the transcript is highlighted when the transcript is displayed on a display device.

16. The method of claim 1 wherein receiving the video information at the presentation recorder device comprises using a video splitter to capture the video information at the presentation recorder appliance from the first source.

17. The method of claim 1 wherein providing at the presentation recorder appliance access to the stored in formation comprises generating a user interface for accessing the stored information, the user interface comprising:
a first area configured to display a portion of the stored information;
a second area configured to receive a search term; and
a third area configured to display one or more portions of the stored information comprising the search term.

18. A system for recording information, the system comprising:
a first device configured to capture video information from a first source;
a second device configured to capture audio information; and
a third device configured to:
receive the video information from the first device;
receive the audio information;
automatically analyze the video information to select a set of one or more video frames from the video information;
automatically analyze one or more of the set of one or more video frames to extract, based on one or more text recognition techniques, text information from the set of one or more video frames;
automatically analyze the audio information to extract text information from the audio information;
store the set of one or more video frames and the audio information to create stored information;
automatically index the stored information using the text information extracted from the set of one or more video frames to generate an index between the textual information extracted from the set of video frames and the stored information;
automatically index the stored information using the text information extracted from the audio information to generate an index between the text information extracted from the audio information and the stored information; and
provide access to the stored information based on the index between the textual information extracted from the set of video frames and the stored information and the index between the text information extracted from the audio information and the stored information.

19. The system of claim 18 wherein the third device is configured to apply an optical character recognition technique to the set of one or more video frames to extract the text information.

20. The system of claim 18 wherein the third device is configured to extract the text information from the audio information by using at least one of voice recognition or audio transcription.

21. The system of claim 18 wherein the second device comprises an audio information capture device configured to capture the audio information.

22. The system of claim 18 wherein the audio information is captured from a second source, wherein the second source is different from the first source.

23. The system of claim 22 wherein the second source is a person.

24. The system of claim 18 wherein the audio information is captured from the first source.

25. The system of claim 18 wherein the third device is configured to synchronize the set of one or more video frames and the stored audio information.

26. The system of claim 18 wherein the third device is configured to capture the video information while contents of a file are displayed by the first source.

27. The system of claim 26 wherein the file comprises a multimedia presentation file.

28. The system of claim 27 wherein the multimedia presentation file is a file created using a Microsoft Powerpoint application.

29. The system of claim 26 wherein third device is configured to automatically initiate capture of the video information upon opening of the file on the first source.

30. The system of claim 18 wherein the third device is configured to:
receive a search term;
identify a portion of the stored information comprising the search term based on the index; and
cause the portion of the stored information to be output.

31. The system of claim 30 wherein the third device is configured to identify at least one video frame from the set of video frames that comprises the search term and cause the at least one video frame to be displayed on a display device, wherein an occurrence of the search term in the at least one video frame is highlighted on the display device.

32. The system of claim 30 wherein the third device is configured to:
identify the portion of the stored information comprising the search term comprises identifying a portion of the stored audio information that comprises the search term; and
cause the portion of the stored audio information to be output or cause a transcript of the portion of the stored audio to be displayed on a display device, wherein an occurrence of the search term in the transcript is highlighted on the display device.

33. The system of claim 18 wherein the first device comprises a video splitter configured to capture the video information from the first source.

34. The system of claim 18 wherein the third device is further configured to generate a user interface for accessing the stored information, the user interface comprising a first area configured to display a portion of the stored information, a second area configured to receive a search term, and a third area configured to display one or more portions of the stored information comprising the search term.

35. A computer-readable storage medium storing a plurality of instructions for controlling a processor to record information during a multimedia presentation, the plurality of instructions comprising:

instructions that cause the processor to receive video information captured from a first source in one or more information sources;

instructions that cause the processor to receive audio information captured from one of the one or more information sources;

instructions that cause the processor to analyze the video information to select a set of one or more video frames from the video information;

instructions that cause the processor to analyze one or more of the set of one or more video frames to extract, based on one or more text recognition techniques, text information from the set of one or more video frames;

instructions that cause the processor to analyze the audio information to extract text information from the audio information;

instructions that cause the processor to store the set of one or more video frames and the audio information to create stored information;

instructions that cause the processor to index the stored information using the text information extracted from the set of one or more video frames to generate an index between the text information extracted from the set of video frames and the stored information;

instructions that cause the processor to index the stored information using the text information extracted from the audio information to generate an index between the text information extracted from the audio information and the stored information; and instructions that cause the processor to provide access to the stored information based on the index between the textual information extracted from the set of video frames and the stored information and the index between the text information extracted from the audio information and the stored information.

* * * * *